(12) United States Patent
Metzger

(10) Patent No.: US 12,699,371 B2
(45) Date of Patent: Aug. 4, 2026

(54) ENHANCED SYSTEMS AND METHODS FOR OBSERVING, MEASURING, AND CONTROLLING EMISSIONS

(71) Applicant: Stefan Metzger, Longmont, CO (US)

(72) Inventor: Stefan Metzger, Longmont, CO (US)

( * ) Notice: Subject to any disclaimer, the term of this patent is extended or adjusted under 35 U.S.C. 154(b) by 774 days.

(21) Appl. No.: 17/750,343

(22) Filed: May 21, 2022

(65) Prior Publication Data

US 2022/0276625 A1 Sep. 1, 2022

Related U.S. Application Data

(63) Continuation-in-part of application No. 16/679,200, filed on Nov. 9, 2019, now Pat. No. 11,946,921.

(60) Provisional application No. 63/191,760, filed on May 21, 2021, provisional application No. 62/758,269, filed on Nov. 9, 2018.

(51) Int. Cl.

| | |
|---|---|
| *G05B 15/02* | (2006.01) |
| *G01N 33/24* | (2006.01) |
| *G06F 17/15* | (2006.01) |
| *G06F 18/25* | (2023.01) |
| *G06N 20/00* | (2019.01) |
| *G06Q 30/018* | (2023.01) |
| *G06V 20/13* | (2022.01) |

(52) U.S. Cl.
CPC ........... *G05B 15/02* (2013.01); *G06Q 30/018* (2013.01)

(58) Field of Classification Search
CPC .... G05B 15/02; G06Q 30/018; G06K 9/6289; G01N 33/24; G06F 17/15; G06F 18/251; G06N 20/00; G06V 20/13

USPC .............................................................. 702/1
See application file for complete search history.

(56) References Cited

U.S. PATENT DOCUMENTS

| | | | |
|---|---|---|---|
| 7,953,558 B2 | 5/2011 | Burba et al. | |
| 8,595,020 B2 | 11/2013 | Marino | |
| 11,946,921 B2 * | 4/2024 | Metzger | G06F 18/251 |
| 2002/0189600 A1 * | 12/2002 | Nydam | F02M 26/53 |
| | | | 123/568.21 |
| 2012/0216881 A1 * | 8/2012 | Donoghue | A01G 25/16 |
| | | | 137/386 |
| 2017/0120191 A1 * | 5/2017 | Nurkowski | E21B 41/0057 |
| 2017/0310775 A1 * | 10/2017 | Tatourian | H04L 67/535 |
| 2017/0330466 A1 * | 11/2017 | Demetriades | G08G 5/0086 |
| 2017/0351543 A1 * | 12/2017 | Kimura | G06F 16/2365 |
| 2020/0151522 A1 * | 5/2020 | Metzger | G01N 33/24 |

FOREIGN PATENT DOCUMENTS

KR 20170016162 A * 2/2017

OTHER PUBLICATIONS

English translation of KR 20170016162, Feb. 13, 2017. (Year: 2017).*

(Continued)

*Primary Examiner* — Michael P Nghiem

(57) ABSTRACT

A method and system for controlling emissions by combining environmental response information, first environmental driver information and/or second environmental driver information to produce a space and time aligned data set that in turn can be used to produce a driver-response relationship model. Then using the driver-response relationship model to generate enhanced environmental response output information, which can be used to control emissions.

20 Claims, 19 Drawing Sheets

(56) References Cited

OTHER PUBLICATIONS

Desjardins, R. L., Worth, D. E., Pattey, E., VanderZaag, A., Srinivasan, R., Mauder, M., Worthy, D., Sweeney, C., and Metzger, S.: The challenge of reconciling bottom-up agricultural methane emissions inventories with top-down measurements, Agric. for. Meteorol., 248, 48-59, doi:10.1016/j.agrformet.2017.09.003, 2018. Elsevier: US/Netherlands (Published online).

Kohnert, K., Serafimovich, A., Metzger, S., Hartmann, J., and Sachs, T.: Strong geologic methane emissions from discontinuous terrestrial permafrost in the Mackenzie Delta, Canada, Scientific Reports, 7, 5828, doi:10.1038/s41598-017-05783-2, 2017. Nature: UK (Published online).

Kohnert, K., Juhls, B., Muster, S., Antonova, S., Serafimovich, A., Metzger, S., Hartmann, J., and Sachs, T.: Toward understanding the contribution of waterbodies to the methane emissions of a permafrost landscape on a regional scale—A case study from the Mackenzie Delta, Canada, Global Change Biol., 24, 3976-3989, doi:10.1111/gcb.14289, 2018. Wiley US (Published online).

Metzger, S.: Applicability of weight-shift microlight aircraft for measuring the turbulent exchange above complex terrain, Doctoral thesis, Faculty of Biology, Chemistry and Geosciences, University of Bayreuth, Bayreuth, 131 pp., 2013. Germany.

Metzger, S., Junkermann, W., Mauder, M., Butterbach-Bahl, K., Trancón y Widemann, B., Neidl, F., Schäfer, K., Wieneke, S., Zheng, X. H., Schmid, H. P., and Foken, T.: Spatially explicit regionalization of airborne flux measurements using environmental response functions, Biogeosciences, 10, 2193-2217, doi:10.5194/bg-10-2193-2013, 2013. Copernicus Publications, Germany.

Metzger, S., Durden, D., Sturtevant, C., Luo, H., Pingintha-Durden, N., Sachs, T., Serafimovich, A., Hartmann, J., Li, J., Xu, K., and Desai, A. R.: eddy4R 0.2.0: a DevOps model for community-extensible processing and analysis of eddy-covariance data based on R, Git, Docker, and HDF5, Geosci. Model Dev., 10, 3189-3206, doi:10.5194/gmd-10-3189-2017, 2017. Copernicus Publications, Germany.

Metzger, S.: Surface atmosphere exchange in a box: Making the control volume a suitable representation for in-situ observations, Agric. for. Meteorol., 255, 68-80, doi:10.1016/j.agrformet.2017.08.037, 2018a. Elsevier: US/Netherlands (Published online).

Metzger, S.: Surface-atmosphere exchange in a box [popular science article], https://sciencetrends.com/surface-atmosphere-exchange-in-a-box/, doi:10.13140/RG.2.2.33535.51362, 2018b. US.

Serafimovich, A., Metzger, S., Hartmann, J., Kohnert, K., Zona, D., and Sachs, T.: Upscaling surface energy fluxes over the North Slope of Alaska using airborne eddy-covariance measurements and environmental response functions, Atmos. Chem. Phys., 18, 10007-10023, doi:10.5194/acp-18-10007-2018, 2018b. Copernicus Publications, Germany.

Sühring, M., Metzger, S., Xu, K., Durden, D., and Desai, A.: Trade-offs in flux disaggregation: a large-eddy simulation study, Boundary Layer Meteorol., 170, 69-93, doi:10.1007/s10546-018-0387-x, 2018. US.

Vaughan, A. R., Lee, J. D., Misztal, P. K., Metzger, S., Shaw, M. D., Lewis, A. C., Purvis, R. M., Carslaw, D. C., Goldstein, A. H., Hewitt, C. N., Davison, B., Beevers, S. D., and Karl, T. G.: Spatially resolved flux measurements of NOx from London suggest significantly higher emissions than predicted by inventories, Faraday Discuss., 189, 455-472, doi:10.1039/c5fd00170f, 2016. Royal Society of Chemistry UK.

Vaughan, A. R., Lee, J. D., Shaw, M. D., Misztal, P. K., Metzger, S., Vieno, M., Davison, B., Karl, T. G., Carpenter, L. J., Lewis, A. C., Purvis, R. M., Goldstein, A. H., and Hewitt, C. N.: VOC emission rates over London and South East England obtained by airborne eddy covariance, Faraday Discuss., 200, 599-620, doi:10.1039/c7fd00002b, 2017. Royal Society of Chemistry UK.

Xu, K., Metzger, S., and Desai, A. R.: Upscaling tower-observed turbulent exchange at fine spatio-temporal resolution using environmental response functions, Agric. for. Meteorol., 232, 10-22, doi:10.1016/j.agrformet.2016.07.019, 2017. Elsevier: US/Netherlands (Published online).

Xu, K., Metzger, S., and Desai, A. R.: Surface-atmosphere exchange in a box: Space-time resolved storage and net vertical fluxes from tower-based eddy covariance, Agric. for. Meteorol., 255, 81-91, doi:10.1016/j.agrformet.2017.10.011, 2018. Elsevier: US/Netherlands (Published online).

* cited by examiner

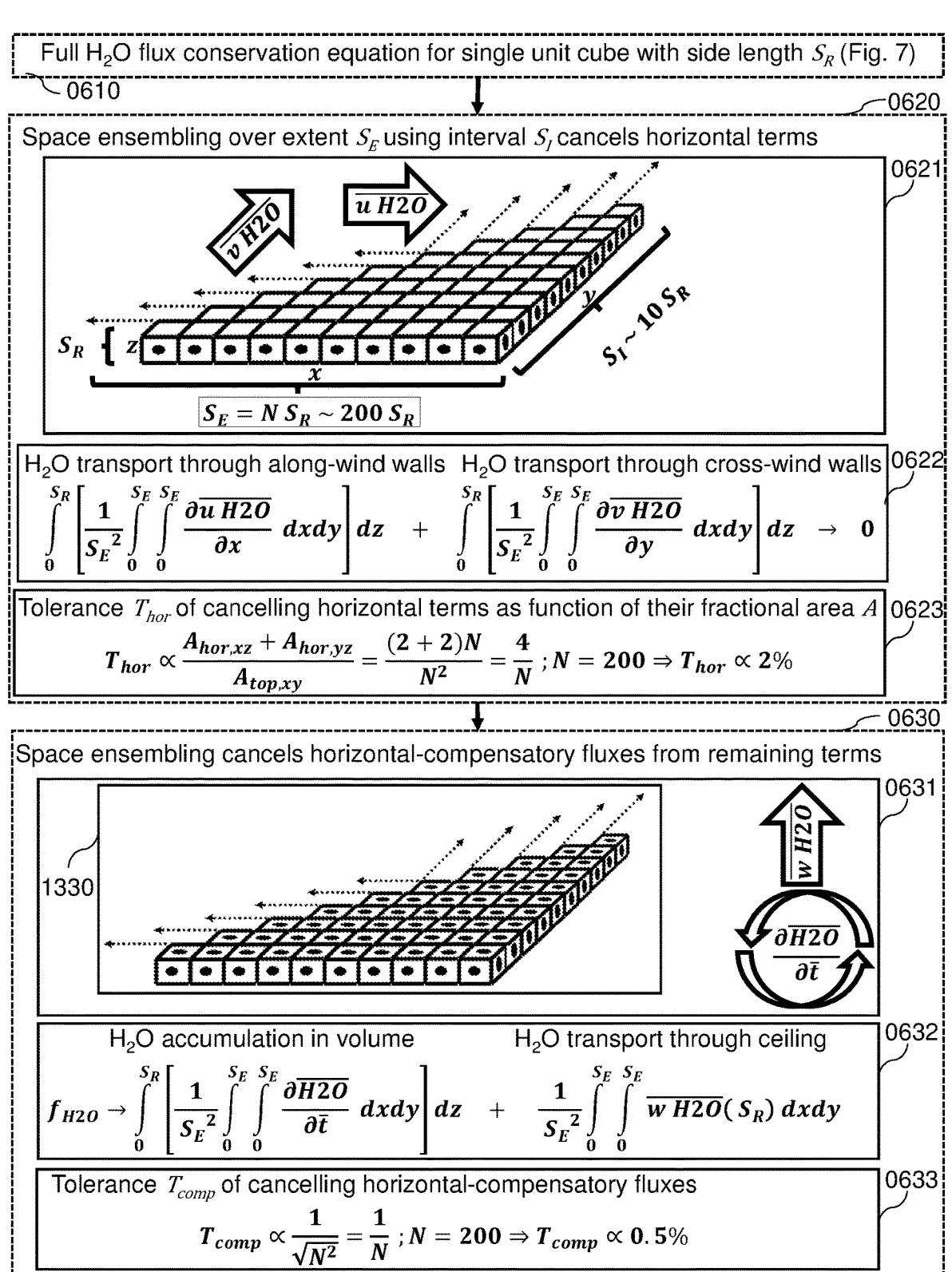

Full $H_2O$ flux conservation equation for single unit cube with side length $S_R$ (Fig. 7)

0610

0620

Space ensembling over extent $S_E$ using interval $S_I$ cancels horizontal terms

0621

$S_I \sim 10\, S_R$ $$S_E = N\, S_R \sim 200\, S_R$$

$H_2O$ transport through along-wind walls    $H_2O$ transport through cross-wind walls    0622

$$\int_0^{S_R}\left[\frac{1}{S_E^{\,2}}\int_0^{S_E}\int_0^{S_E}\frac{\overline{\partial u\, H2O}}{\partial x}\,dx\,dy\right]dz \;+\; \int_0^{S_R}\left[\frac{1}{S_E^{\,2}}\int_0^{S_E}\int_0^{S_E}\frac{\overline{\partial v\, H2O}}{\partial y}\,dx\,dy\right]dz \;\to\; 0$$

Tolerance $T_{hor}$ of cancelling horizontal terms as function of their fractional area $A$    0623

$$T_{hor} \propto \frac{A_{hor,xz}+A_{hor,yz}}{A_{top,xy}} = \frac{(2+2)N}{N^2} = \frac{4}{N}\;;\; N = 200 \Rightarrow T_{hor} \propto 2\%$$

0630

Space ensembling cancels horizontal-compensatory fluxes from remaining terms

0631

1330

$w\,H2O$ $$\frac{\overline{\partial H2O}}{\partial \bar{t}}$$

$H_2O$ accumulation in volume    $H_2O$ transport through ceiling    0632

$$f_{H2O} \to \int_0^{S_R}\left[\frac{1}{S_E^{\,2}}\int_0^{S_E}\int_0^{S_E}\frac{\overline{\partial H2O}}{\partial \bar{t}}\,dx\,dy\right]dz \;+\; \frac{1}{S_E^{\,2}}\int_0^{S_E}\int_0^{S_E}\overline{w\,H2O}(S_R)\,dx\,dy$$

Tolerance $T_{comp}$ of cancelling horizontal-compensatory fluxes    0633

$$T_{comp} \propto \frac{1}{\sqrt{N^2}} = \frac{1}{N}\;;\; N = 200 \Rightarrow T_{comp} \propto 0.5\%$$

ENHANCED SYSTEMS AND METHODS FOR OBSERVING, MEASURING, AND CONTROLLING EMISSIONS

This patent application is a continuation-in-part of U.S. Patent Application Ser. No. 16/679,200 filed 9 Nov. 2019, now U.S. Pat. No. 11,946,921, which claims benefit of U.S. Provisional Patent Application Ser. No. 62/758,269 filed 9 Nov. 2018. This application also claims benefit of U.S. Provisional Patent Application Ser. No. 63/191,760 filed 21 May 2021. The entire disclosure of all aforementioned applications are incorporated by reference herein.

FIELD OF INVENTION

The present invention relates to scientific measurements. More specifically, the present invention relates to systems and methods that combine information from multiple instruments to improve the performance of a scientific measurement. Examples of these improvements to scientific measurements can include (a) improving the accuracy and/or precision of a measurement by reducing systematic errors and/or random errors and (b) increasing the resolution, extent, and/or coverage of a measurement in space and/or time.

BACKGROUND

It can be difficult and expensive to measure certain physical phenomena directly at a sufficient number of locations (i.e. space resolution, space extent and space coverage) and/or with sufficient repetition rate and duration (i.e. time resolution, time extent and time coverage) to make scientific computations at the desired accuracy, precision, random error, systematic error, and/or resolution, extent and coverage in space and/or time. This is because some types of environmental measurements require expensive instrumentation, instruments that are difficult to deploy at all the required physical locations, repetition rate and duration, and/or instrumentation can affect the environment being measured. For example, the instrumentation to measure momentum, energy and mass fluxes in a fluid is complex, expensive, and invasive of the environment being measured.

Other types of physical phenomena can be measured relatively easily, quickly, inexpensively, accurately, precisely, and/or at a high resolution, extent and coverage in space and/or time. For example, temperature is relatively easy and inexpensive to measure, and can even be measured remotely since a radiating body will give off a specific electromagnetic spectral signature. That's how we can measure the temperatures of distant astronomical bodies. If it were possible to relate information from inexpensive measurements to information from more expensive measurements, one could use the inexpensive data to improve the accuracy, precision and/or resolution, extent and coverage in space and/or time of the expensive data.

Similarly, the time response of some physical phenomena and/or some scientific instruments is much faster than the time response for other physical phenomena and/or instruments. For example, surface temperature can change faster than internal temperature as a result of the thermal mass (heat capacitance) of an object. Thus, high-frequency (i.e., time resolution) measurement of the surface of an object can be used to determine internal temperature as well as being able to facilitate the modeling of the internal heat flux.

Instruments can also exhibit systematic and/or random errors as a result of damage, wear, aging, etc. Scientific computations can produce systematic and/or random errors as a result of underlying assumptions not being met by a single type of instrument, such as limited resolution, extent and/or coverage in space and/or time of the measurements. By relating measurements from multiple instruments using innovative systems and/or methods it may be possible to compensate for such systematic and/or random errors.

U.S. patent application Ser. No. 16/679,200 provides such systems and methods that relate measurements from multiple instruments to improve the performance of a scientific measurement. These systems and methods yield the necessary accuracy, precision, and space-time resolution, extent and coverage to make the measurements useful for natural climate solutions, emission inventory validation, urban air quality, industry leak detection and multi-species applications, among other use cases. Furthermore, they provide evidence-based process model benchmarks for improving environmental predictions.

It is desired to build on the systems and methods set forth in U.S. patent application Ser. No. 16/679,200 in ways that reduce the requirements on input data and computational resources, to utilize categorical data, and improve cost-efficiency for achieving the desired accuracy, precision, and space-time resolution, extent and coverage of the results.

In summary, the goal is a system/method that further enhances the effectiveness and cost-efficiency of measuring physical phenomena. This is achieved through combining complementary information from multiple instrument types through space-time deconvolution as further detailed herein, which optimizes joint measurement performance, i.e. accuracy, precision and/or resolution, extent and coverage in space and/or time.

BRIEF DESCRIPTION OF THE DRAWINGS

The present disclosure is described in conjunction with the appended figures in which:

FIG. 6 shows an example of how a physical constraint shown in FIG. 7 can be constructed by reducing the $H_2O$ flux conservation equation in FIG. 7 to two fully quantifiable differential equation terms by means of space-time deconvolution and subsequent ensembling;

Figure 1:
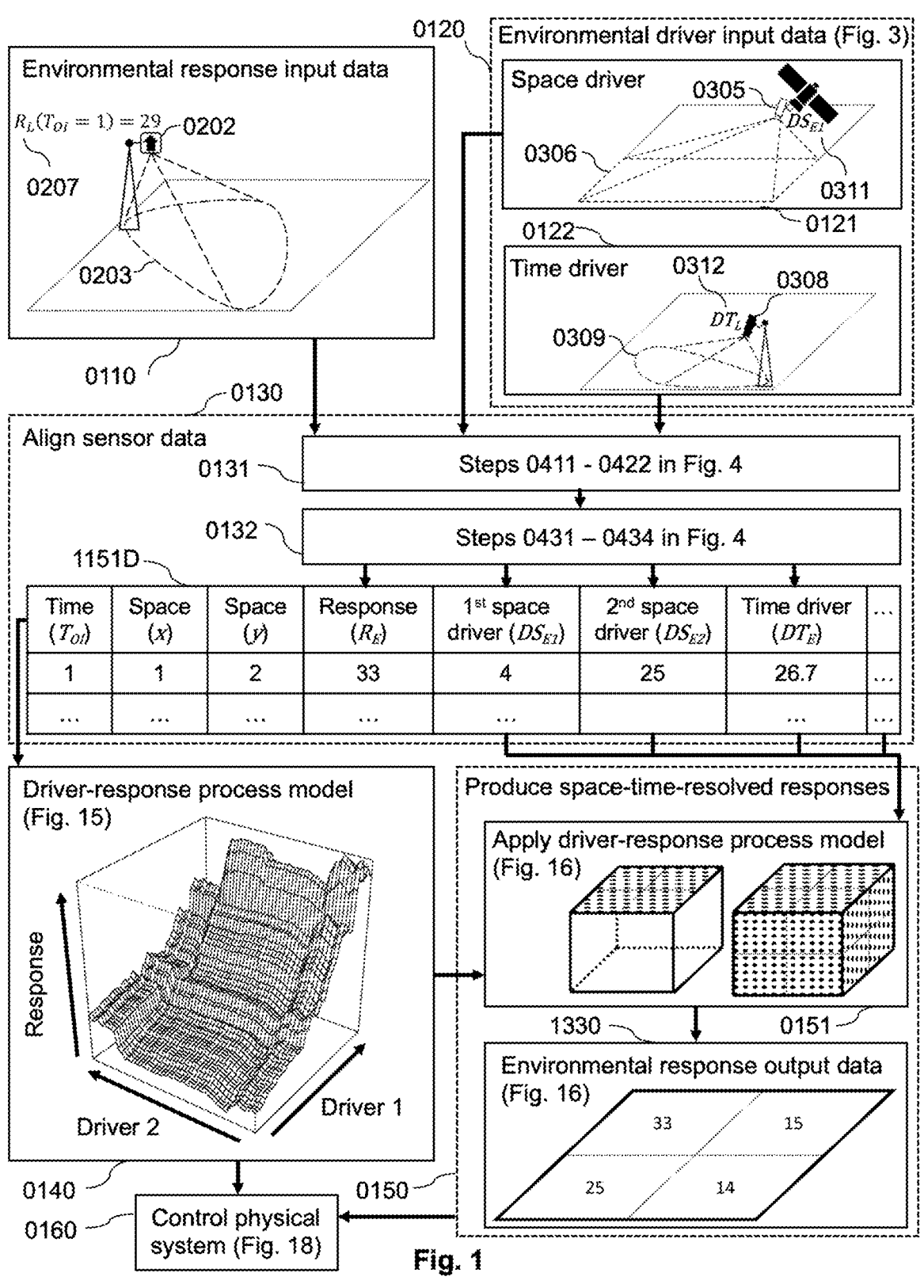
FIG. 1 provides a high-level overview of a method that uses environmental response input data 0110 and environmental driver input data 0120, aligns this data 0130, and produces a driver-response process model 0140 and enhanced environmental response output data 1330 to control a physical system 0160.

It should be understood that the drawings are not necessarily to scale. In certain instances, details that are not necessary for an understanding of the invention or that render other details difficult to perceive may have been omitted. It should be understood that the invention is not necessarily limited to the particular embodiments illustrated herein.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It should be understood that various changes could be made in the function and arrangement of elements without departing from the spirit and scope as set forth in the appended claims.

Specific details are given in the following description to provide a thorough understanding of the embodiments. However, it will be understood by one of ordinary skill in the art that the embodiments may be practiced without these specific details. For example, those skilled in the art will know that different data sources, data sets, instrumentation, measurements, physical parameters, process steps, execution order, physical models, and mathematical models, may be substituted.

1. Definitions

In one embodiment, the system and/or method can be used for improving the accuracy of a measurement. For purposes of this document and the appended claims, accuracy is defined as the closeness of the measurements to a reference value.

In this disclosure and the appended claims, the system or method could be used for improving the precision of a measurement. For purposes of this document and the appended claims, precision is defined as the closeness of measurements to each other.

In this disclosure and the appended claims, the system or method could be used for reducing systematic measurement errors. For purposes of this document and the appended claims, the term systematic error is defined as an accuracy error.

In this disclosure and the appended claims, the system or method could be used for reducing random measurement errors. For purposes of this document and the appended claims, the term random error is defined as a precision error.

In this disclosure and the appended claims, the system or method could be used for improving space resolution. For purposes of this document and the appended claims, the term space resolution is defined as the smallest distance, area or volume rendered by a measurement and/or set of data. Space resolution is synonymous with spatial resolution.

In this disclosure and the appended claims, the system or method could be used for improving space extent. For purposes of this document and the appended claims, the term space extent is defined as the largest distance, area or volume encompassed by a measurement and/or set of data. Space extent is synonymous with spatial extent.

In this disclosure and the appended claims, the system or method could be used for improving space coverage. For purposes of this document and the appended claims, the term space coverage is defined as the degree to which a measurement and/or set of data populates a space extent. Space coverage is synonymous with spatial coverage.

In this disclosure and the appended claims, the system or method could be used for improving time resolution. For purposes of this document and the appended claims, the term time resolution is defined as the shortest duration rendered by a measurement and/or set of data. Time resolution is synonymous with temporal resolution.

In this disclosure and the appended claims, the system or method could be used for improving time extent. For purposes of this document and the appended claims, the term time extent is defined as the longest duration encompassed by a measurement and/or set of data. Time extent is synonymous with temporal extent.

In this disclosure and the appended claims, the system or method could be used for improving time coverage. For purposes of this document and the appended claims, the term time coverage is defined as the degree to which a measurement and/or set of data populates a time extent. Time coverage is synonymous with temporal coverage.

In this disclosure and the appended claims, the system or method could be used for improving the performance of a measurement. For purposes of this document and the appended claims, the term performance is defined as any one or more of accuracy, precision, random error, systematic error, space resolution, space extent, space coverage, time resolution, time extent, time coverage.

For purposes of this document and the appended claims, the term coordinate representation is defined as the use of one or more variables to uniquely determine the location of points or other geometric shapes such as lines, areas or volumes.

For purposes of this document and the appended claims, the terms coordinate representation and space representation are used interchangeably.

For purposes of this document and the appended claims, the term time representation is defined as a chronological order relative to an origin that is fixed in time and space.

For purposes of this document and the appended claims, the terms align and unify are used interchangeably, and are defined as arranging environmental measurements in a predefined order.

For purposes of this document and the appended claims, the term space-aligned is defined as arranging environmental measurements from different space representations into a single, shared space representation.

For purposes of this document and the appended claims, the terms time-aligned and time-synchronized are used interchangeably, and are defined as arranging environmental measurements from different time representations into a single, shared time representation.

For purposes of this document and the appended claims, the term Eulerian is defined as a coordinate representation that registers objects as a function of time and location, along a symmetric, regular and static line (1-dimensional), plane (2-dimensional, e.g. flat Eulerian surface), and/or volume (3-dimensional).

For purposes of this document and the appended claims, the term Lagrangian is defined as a coordinate representation that registers objects by following their trajectory as a function of time, along an asymmetric, irregular and transient 1-dimensional line, 2-dimensional plane, and/or 3-dimensional volume. Aggregating the 3-dimensional trajectories of a multitude of objects from their joint destination, such as an environmental response measurement, back to their respective sources results in a Lagrangian transport plume.

For purposes of this document and the appended claims, the term georeferencing is defined as relating an objects internal coordinate representation to a geographical coordinate representation. Georeferencing is one embodiment of producing space-aligned environmental measurements, and specifically includes the transformation from Lagrangian to Eulerian coordinate representation.

For purposes of this document and the appended claims, the terms space and time aligned dataset and georeferenced and time-synchronized data table as well as combinations thereof are used interchangeably.

For purposes of this document and the appended claims, the term influence function is defined as the continuous geometric intersection of an object in Eulerian coordinate representation (Eulerian object) or Lagrangian coordinate representation (Lagrangian object) with another Eulerian object or Lagrangian object. For example, the continuous geometric intersection of a Lagrangian transport plume with a Eulerian surface yields one type of surface influence function. The integral over an influence function is unity. Discretizing the continuous influence function to the space resolution of a gridded Eulerian object yields discrete influence weights. For example, discretizing the continuous surface influence function of the Lagrangian transport plume to the space resolution of a gridded Eulerian surface yields one type of discrete surface influence weights. The sum of all influence weights is unity. The influence weights resemble the relative information contribution of each Eulerian grid cell to the information aggregate at their joint destination. For example, the surface influence weights of the Lagrangian transport plume resemble the relative information contribution of each grid cell on the Eulerian surface to the environmental response measurement.

For purposes of this document and the appended claims, the term convolution is defined as a mathematical operation on two variables f and g that produces a third variable h that combines the two in the form f*g=h. For example, $h=R_L$ can be a response measurement in Lagrangian coordinate representation, $f=R_E$ the actual environmental response in Eulerian coordinate representation, and g=w the surface influence weights that relate the two in the form $R_E*w=R_L$. Substituting a measured driver in Eulerian coordinate representation $f=D_E$ allows to convolve that driver into the Lagrangian coordinate representation $D_L$ of the response measurements in the form $D_E*w=D_L$. This Eulerian-to-Lagrangian convolution can be used to generate a shared, space-aggregated representation of $R_L$, $D_L$ etc. and thus to create a joint, space and time aligned data table in the form of a space-aligned time-series.

For purposes of this document and the appended claims, the term deconvolution is defined as a mathematical operation inverse to convolution. For example, finding the solution $R_E$ of the convolution equation $R_E*w=R_L$, i.e., separating the actual environmental response in Eulerian coordinate representation $R_E$ from the response measurement in Lagrangian coordinate representation $R_L$ through application of the surface influence weights w that relate the two. This Lagrangian-to-Eulerian deconvolution can be used to generate a shared, space-resolved representation of $R_E$, measured drivers in Eulerian coordinate representation $D_E$ etc., and thus to create a joint, space and time aligned data table in the form of time-aligned spatial grids.

For purposes of this document and the appended claims, the term natural environment is defined as all living and non-living things in a physical region without human influence. A natural environment includes, but is not limited to a planetary geosphere, pedosphere, hydrosphere, biosphere, atmosphere and their astronomical interactions such as sun-earth interaction.

For purposes of this document and the appended claims, the term anthropogenic environment is defined as living and non-living things that exist in a physical region as a result of human influence. The anthropogenic environment can include anthropogenic infrastructure such as infrastructure used for fossil fuel extraction including but not limited to refineries, transportation (including both stationary infrastructure and vehicles), buildings, telecommunications networks, and anything else that is human created or human influenced. Further examples of human interference that characterize the anthropogenic environment include but are not limited to agriculture, forestry, and other alterations of the natural environment because of humans, including feedback of the natural environment to human activity. Whenever the term environment is used in this document and/or claims, it can refer to either the natural environment, the anthropogenic environment or a combination of both.

For purposes of this document and the appended claims, the term physical system is defined as a collection of physical objects from the environment for which to control emission. A physical system can comprise an energy production system including but not limited to a fossil fuel production system and biofuel production system, an industrial system including but not limited to an emission reduction system, a body of water, and an urban region. Another example of a physical systems is an agricultural system including but not limited to rangeland, ranching, cattle and feedlots, farmland, forestland, timber production, biomass production, grassland, shrubland, wetland, ice/snow, and barren areas. For purposes of the embodiments and claims disclosed herein agricultural systems include working lands including but not limited to public lands, federal lands, and proving grounds.

For purposes of this document and the appended claims, the term positive emission is defined as the release of a substance from a physical system, and the term negative emission is defined as the uptake of a substance by a physical system. The term emission encompasses both, positive emission and negative emission.

For purposes of this document and the appended claims, the term commodity is defined as a resource that can be bought and sold. Examples for commodities include a carbon and oxygen compound, a nitrogen and hydrogen compound, a nitrogen and oxygen compound, a sulfur and hydrogen compound, and organic compound, water, ozone, heat, industrial products, energy products, and agricultural products. Resources and commodities can be both, substances and properties of substances.

For purposes of this document and the appended claims, the term agent is defined as an intermediary processor that performs various actions autonomously and external to a systems or method. Examples for agents can include computer systems, programs, algorithms, intelligent systems and models.

For purposes of this document and the appended claims, the term transaction is defined as an exchange or interaction between two entities. In this usage of the term transaction, entities include but are not limited to businesses, people, physical systems, and fluids. For example, a transaction could be an emission between a physical system and a fluid such as $H_2O$ emissions from a body of water.

For purposes of this document and the appended claims, the term ledger is defined as a summary that lists individual transactions for accounting purposes. Examples for ledgers include but are not limited to books, datasets, databases, and blockchains. In a ledger, positive emissions can be recorded as debit transactions, and negative emissions can be recorded as credit transactions. Supply, demand and regulatory requirements can control the monetary value of these transactions, which can be traded as commodity certificates such as carbon credits. The transactions can also be processed further into more sophisticated products, tools, services, and to control agents and physical systems.

2. Improvement of Measurement Accuracy and Resolution Through Co-Variance

In one embodiment the present invention comprises a method for enhancing environmental data by combining the information content of at least two environmental input sources that at least partially overlap and co-vary (i.e. correlate) with each other in space and time. The two environmental input sources comprise at least one environmental response and at least one environmental driver that co-varies with this response in space and/or time. The relationships between these input sources are evaluated to produce a best-fit driver-response process model. This best-fit driver-response process model is combined with the original driver input data (synonymous to input information) to produce environmental response output data (synonymous to output information) that is enhanced in one or more of the following ways relative to the environmental response input data:

(a) The environmental response output data has improved accuracy (i.e. fewer systematic errors);

(b) The environmental response output data has improved precision (i.e. fewer random errors);

(c) The environmental response output data has higher time resolution (i.e. higher frequency);

(d) The environmental response output data has higher space resolution (i.e. higher granularity);

(e) The environmental response output data has longer time extent (i.e. encompasses a broader range of times);

(f) The environmental response output data has larger space extent (i.e. encompasses a broader range of locations in one, two or three-dimensional space);

(g) The environmental response output data has higher time coverage (i.e. covering a larger fraction of a defined time extent);

(h) The environmental response data has higher spatial coverage (i.e. covering a larger fraction of a defined space extent); and/or (i) The driver-response model and/or the enhanced environmental response output data can be used for actuating a controller as will be described later in this document.

Embodiments of the invention can incorporate the following attributes:

(a) Deconvolution to decompose the joint information among environmental measurements into a space and time aligned dataset in Eulerian coordinate representation, and/or embedding the deconvolution into the generation of the driver-response process model.

(b) Georeferencing to Eulerian coordinate representation the blended values of time-resolved environmental input data in Lagrangian coordinate representation, which can restore the full amplitude range of the environmental phenomena under investigation.

(c) For a given measurement setup this can yield an order-of-magnitude larger sample for constructing the driver-response process model, which in turn allows for reducing the requirements on environmental measurements and computational resources.

(d) Accommodating new classes of space-resolved environmental input data in Eulerian coordinate representation. These include categorical variables such as anthropogenic sector (road, industry, domestic etc.) as well as the exact values of continuous variables.

(e) Constructing the driver-response process model directly in the targeted Eulerian coordinate representation, which can satisfy the associative property; enhance spatial coverage and range of response product amplitude, and double performance.

3. Detailed Description of One Embodiment

Referring now to the drawings, FIG. 1 shows a method for combining environmental response input data 0110, environmental space driver input data 0121 and environmental time driver input data 0122 for a natural environment into a space and time aligned dataset 1151D, that can be used to generate a driver-response process model 0140, to then produce environmental response output data 1330 of improved accuracy, precision, random error, systematic error, and/or resolution, extent and coverage in space and/or time compared to the input environmental response data 0110 and to control a physical system 0160 as will be described later in the document. It should be noted that the terms space-resolved and space-varying are used synonymously, e.g. space-resolved driver input data (or information), space-varying driver input data (or information), as well as space driver all mean the same. It should further be noted that the terms time-resolved and time-varying are used synonymously, e.g. time-resolved driver input data (or information), time-varying driver input data (or information), as well as time driver all mean the same. The same applies to response data or information.

Referring to 0110 in FIG. 1, when trying to collect data in a natural environment, it can be expensive and/or unfeasible to measure certain environmental responses at a sufficient number of locations (i.e. space resolution, space extent and space coverage) and/or with sufficient repetition rate and duration (i.e. time resolution, frequency, time extent and time coverage) to generate a clear representation of the physical phenomena under investigation. Examples of environmental responses that are expensive and/or unfeasible to measure with sufficient resolution, extent and coverage in space and/or time can include:

(a) Momentum flux;

(b) Energy flux, including but not limited to radiative flux and heat flow;

(c) Mass flux of passive scalars including but not limited to the flows of $H_2O$, $CO_2$, $CH_4$, and of reactive scalars including but not limited to the flows of $O_3$, $NO_x$, $NO_y$, volatile organic compounds and sulfur compounds;

(d) Particle flux, including but not limited to the flow of particulate matter in air;

(e) Liquid fluid flux, including but not limited to the flow of a pollutant species in a river;

(f) Other types of fluxes, including but not limited to magnetic flux, electric flux, luminous flux, diffusion flux, volumetric flux, and acoustic flux.

It should be noted that environmental response input data are not limited to fluxes. Other examples for response measurements that benefit from the performance improvements of the systems and methods described here include, but are not limited to:

(a) Surface and internal temperature of an object;

(b) Abundance and isotopic composition of passive scalars including but not limited to $H_2O$, $CO_2$, $CH_4$, and of reactive scalars including but not limited to $O_3$, $NO_x$, $NO_y$, and volatile organic compounds;

(c) Abundance of particulate matter in air.

Figure 2A:
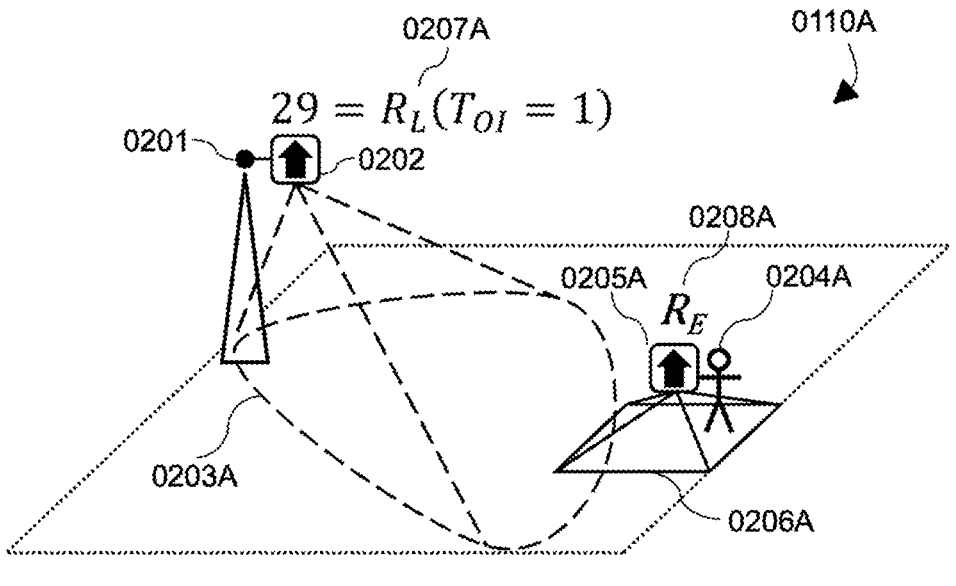
FIG. 2A and FIG. 2B show examples of how environmental response input data are typically generated.
Figure 2B:
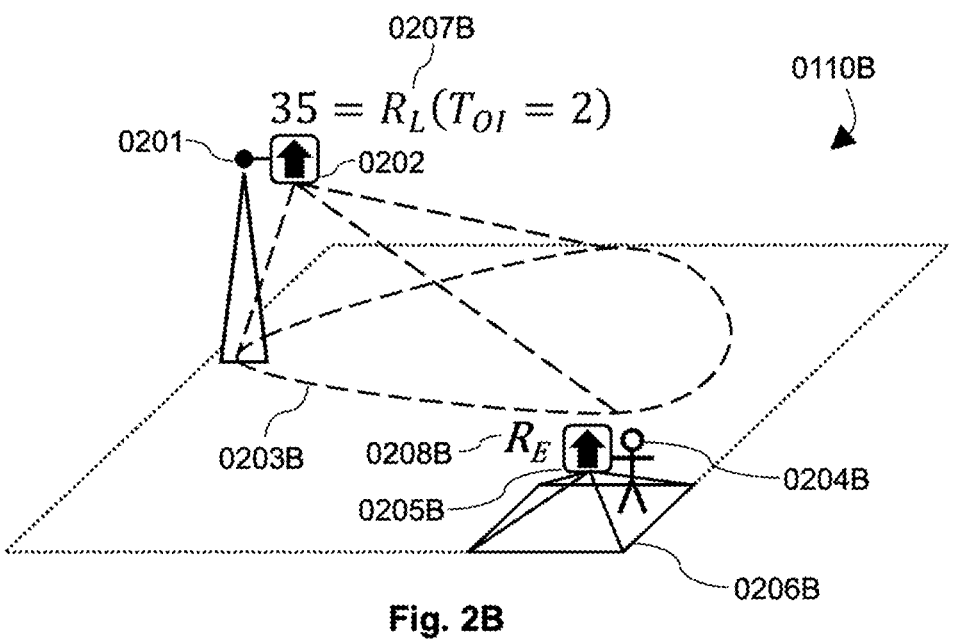
Figure 3A:
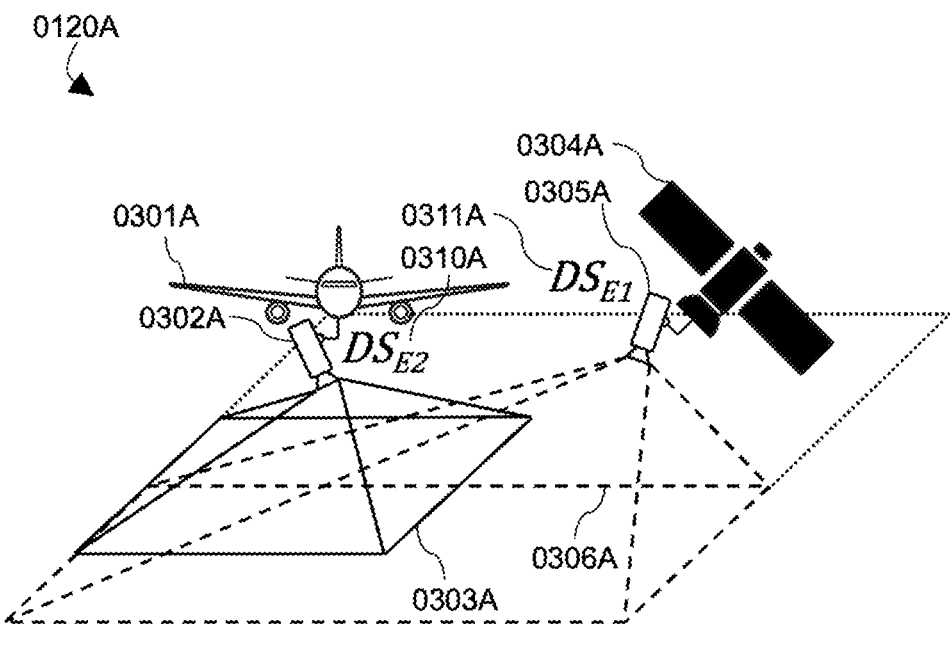
FIG. 3A and FIG. 3B show examples of how environmental driver input data are typically generated.
Figure 3B:
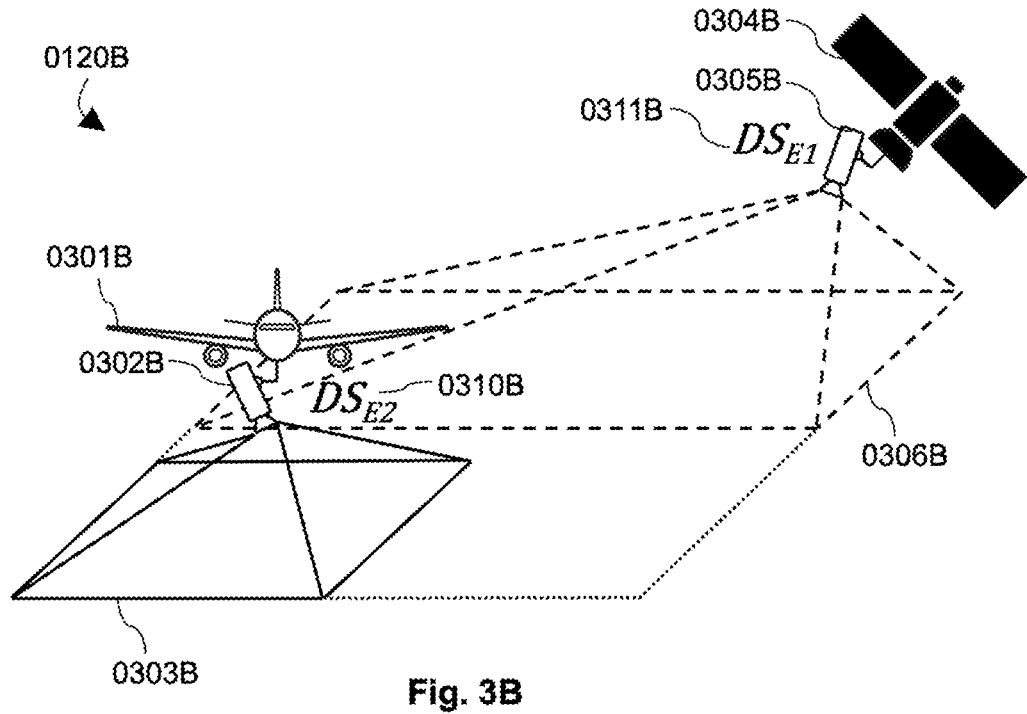
Figure 3C:
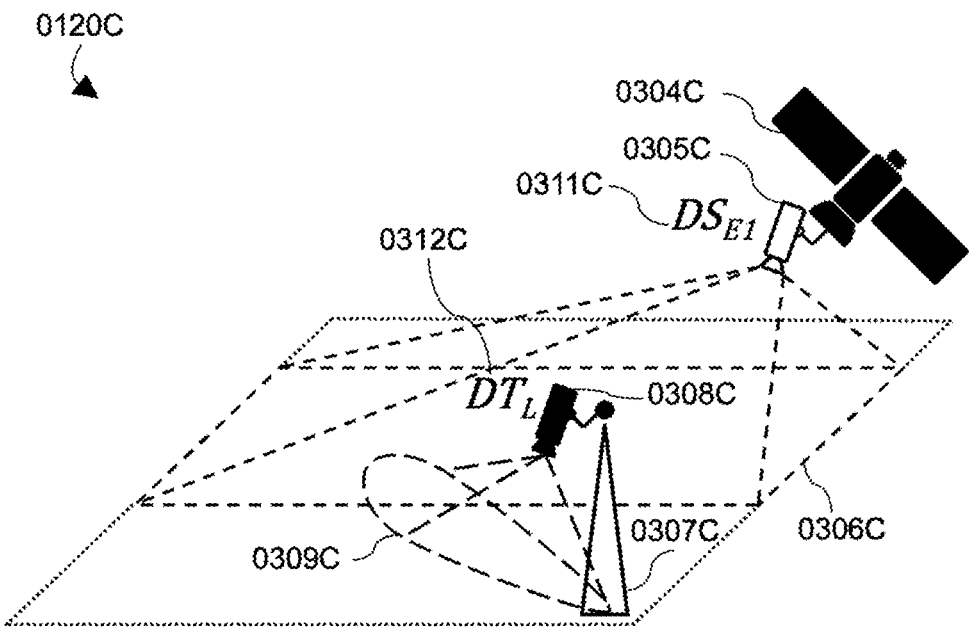
FIG. 3C and FIG. 3D show additional examples of how environmental driver input data are typically generated.
Figure 3D:
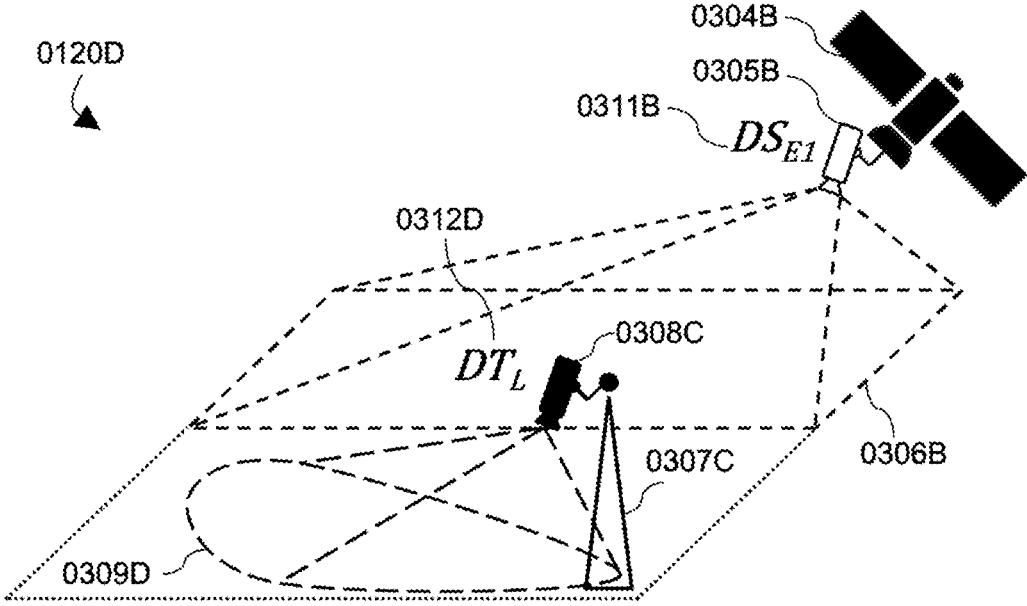

It should be noted that the oblique cones shown at 0203 in FIG. 1, 0203A in FIG. 2A, 0203B in FIG. 2B, 0309 in FIG. 1, 0309C in FIG. 3C, and 0309D in FIG. 3D are Lagrangian transport plumes that can vary in time as a function of wind direction and other environmental factors. In the Lagrangian coordinate representation fluid parcels are followed through time, from the environmental response under investigation. One example of such a measurement is a surface emission of $H_2O$, which can be followed to a location of a measurement instrument shown at 0202 in FIG. 1, FIG. 2A, and FIG. 2B atop a support infrastructure shown at 0201 in FIG. 2A and FIG. 2B, and an example of a corresponding response measurement value in a Lagrangian coordinate representation $R_L$ is shown at 0207 in FIG. 1, at 0207A in FIG. 2A, and at 0207B in FIG. 2B. The planar (or other shaped) surface under investigation at the base of the Lagrangian transport plume is shown in the symmetric and regular Eulerian coordinate representation, i.e., defined by location and time in a fixed frame. As the result of atmospheric blending occurring in the Lagrangian transport plume, the measured response aggregates over many fluid parcels that originated at a distance from the Eulerian surface under investigation. The aggregate, asymmetric and irregular surface influence function of the measured response can be shown by intersecting the Lagrangian transport plume with the Eulerian surface. The cycloid surface contours shown at 0203 in FIG. 1, 0203A in FIG. 2A, and 0203B in FIG. 2B can be used to represent a given percentile of this surface influence function.

Referring to 0120 in FIG. 1, there are many environmental drivers (forcings that cause environmental responses) that can be measured relatively easily, quickly, inexpensively, accurately, precisely, and/or at a high resolution, extent and coverage in space and/or time. Environmental space driver 0121 and environmental time driver 0122 exemplify environmental drivers, further detailed in FIG. 3A, FIG. 3B, FIG. 3C, FIG. 3D, that are relatively easy, quick and/or inexpensive to measure at high resolution, extent and coverage in space and/or time. The environmental space driver 0121 originates from the space-resolved environmental driver measurement instrument at 0305 that yields space-resolved environmental driver measurements at 0311 with a regular surface influence function at 0306, with further detail provided in FIG. 3A, FIG. 3B, FIG. 3C, and FIG. 3D. The environmental time driver 0122 originates from the time-resolved environmental driver measurement instrument at 0308 that yields time-resolved environmental driver measurements at 0312 with an irregular surface influence function at 0309, with further detail provided in FIG. 3C and FIG. 3D. Environmental space drivers 0121 and environmental time drivers 0122 can include:

(a) Temperature can be measured in-situ using Ohm's law based on the electrical resistance of metals, and remotely using Planck's law for black body radiation based on the infrared spectrum of emitted electromagnetic light;

(b) Humidity can be measured using Coulomb's law, in-situ based on the dielectric constant of a polymer or metal oxide, and remotely based on the relationship of radar backscatter and an objects dielectric constant;

(c) Solar radiation can be measured using Planck's law for black body radiation in-situ and remotely based on different spectral bands of emitted electromagnetic light;

(d) Other types of environmental drivers can be measured using above and additional physical laws and mathematical models, in-situ and/or remotely, including but not limited to albedo, vegetation indices, vegetation structure, spectral signature, land cover, anthropogenic infrastructure, land use (including anthropogenic infrastructure), topographic data, geologic data, wind, scalar concentration, isotopic composition, particle count and size distribution, soil data, hydrologic data such as water level, atmospheric structure such as boundary layer height, astronomical data such as sun position, and other information on the anthropogenic environment and/or the natural environment.

Driver measurements 0120 can relate to the response measurements 0110 through laws of science. Examples of physical laws and mathematical models that can be used to relate driver input data 0120 to response input data 0110 can include:

(a) Conservation of mass, for which an example is given in FIG. 6 and FIG. 7, and described in detail later in the document;

(b) Conservation of (linear and/or angular) momentum;

(c) Conservation of energy;

(d) Navier-Stokes equation;

(e) Reynold's decomposition (turbulent fluid flow analysis);

(f) Fick's laws of diffusion, for which a detailed example is given when describing the driver-response process model 0140 later in the document;

(g) Darcy's law of fluid flow;

(h) Newton's law of viscosity;

(i) Fourier's law of conduction;

(j) Flux-gradient similarity;

(k) Profile equations;

(l) Monin-Obukhov similarity;

(m) Bowen-ratio similarity;

(n) Flux-variance similarity;

(o) Transport models;

(p) Advection, diffusion and dispersion models;

(q) Resistance models;

(r) Evapotranspiration models;

(s) Reactive decay models;

(t) Closure techniques.

Provided that the surface influence functions of response input data 0110 and driver input data 0120 overlap at least fractionally in space and time, they can be measured with the same or different instruments deployed at the same or different locations. Here, the response measurement at 0207 in FIG. 1, FIG. 2A, and FIG. 2B is shown in Lagrangian coordinate representation, i.e., fluid parcels are followed through time, and the space driver measurement 0311 is shown in Eulerian coordinate representation, i.e., defined by location and time in a fixed frame. Eulerian-to-Lagrangian convolution can be used to generate a space-aggregated perspective, and Lagrangian-to-Eulerian deconvolution can be used to generate a space-resolved perspective. Note that a response measurement instrument such as 0205A in FIGS. 2A and 0205B in FIG. 2B can provide environmental response measurement variables (or values) in the Eulerian representation such as at 0208A in FIG. 2A and at 0208B in FIG. 2B, and environmental drivers can also be depicted in the Lagrangian representation such as the time driver measurement variable (or value) at 0312 in FIG. 1, and at 0312C in FIGS. 3C and 0312D in FIG. 3D, from the time driver measurement instrument 0308 in FIGS. 1, and 0308C in FIG. 3C and FIG. 3D as referred to earlier when introducing 0203 in FIG. 1, 0203A in FIG. 2A, 0203B in FIG. 2B, 0309 in FIG. 1, 0309C in FIG. 3C, and 0309D in FIG. 3D.

Figure 4:
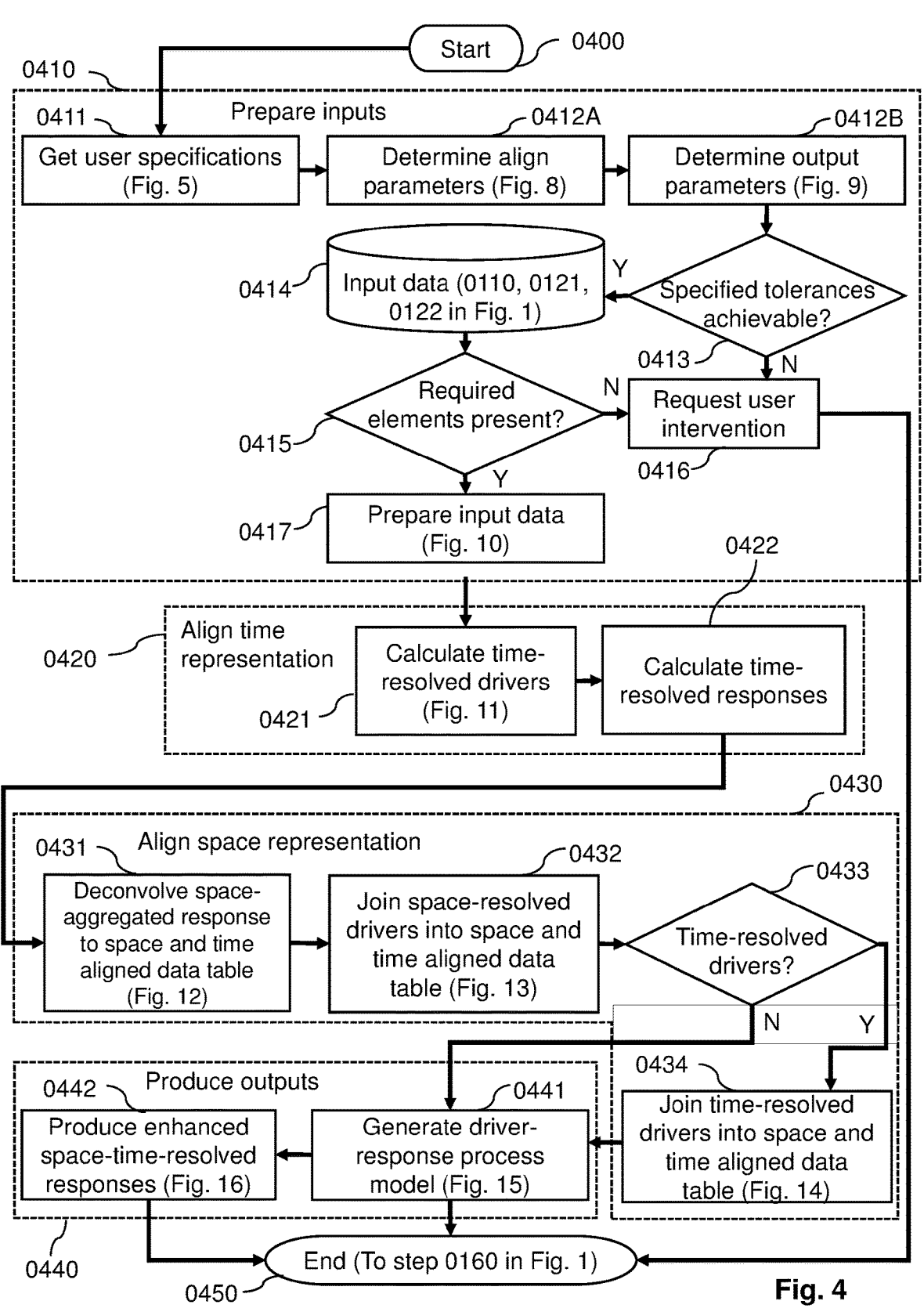
FIG. 4 shows a set of steps for processing the data needed to implement the method of 0110-0150 in FIG. 1.

Further referring to FIG. 1, environmental response measurement input data 0110, space driver measurement input data 0121 and the time driver measurement input data 0122 can be aligned from their respective source coordinate representations into a shared coordinate representation using the steps 0131 and 0132 shown in 0130, and further detailed in FIG. 4. In the embodiment shown in FIG. 1, the space and time aligned data table 1151D is achieved through deconvolving the response measurement data 0110 and the time driver measurement data 0122 from their Lagrangian source coordinate representations to the Eulerian coordinate representation of the space driver measurement data 0121. This is accomplished by combining the response measurements 0110 with their surface influence functions 0203, and by combining the time driver measurements 0380 with their surface influence functions 0309, at the space resolution of the space driver 0121 and target time resolution, resulting in the space and time aligned, co-interpretable training dataset 1151D. This alignment is performed in step 0131 which is explained in detail in FIG. 4 steps 0411-0422, and in step 0132 which is explained in detail in FIG. 4 steps 0431-0434. It should be noted that these detailed explanations include a first and a second space driver measurement shown in FIG.

3A and FIG. 3B in the space and time aligned data table 1151D. The space-time extent of the training dataset 1151D comprises the overlap in space and time among the intersected responses and drivers. Because the environmental response measurements 0110 are comparatively sparse, they also limit the space-time coverage.

Figure 15:
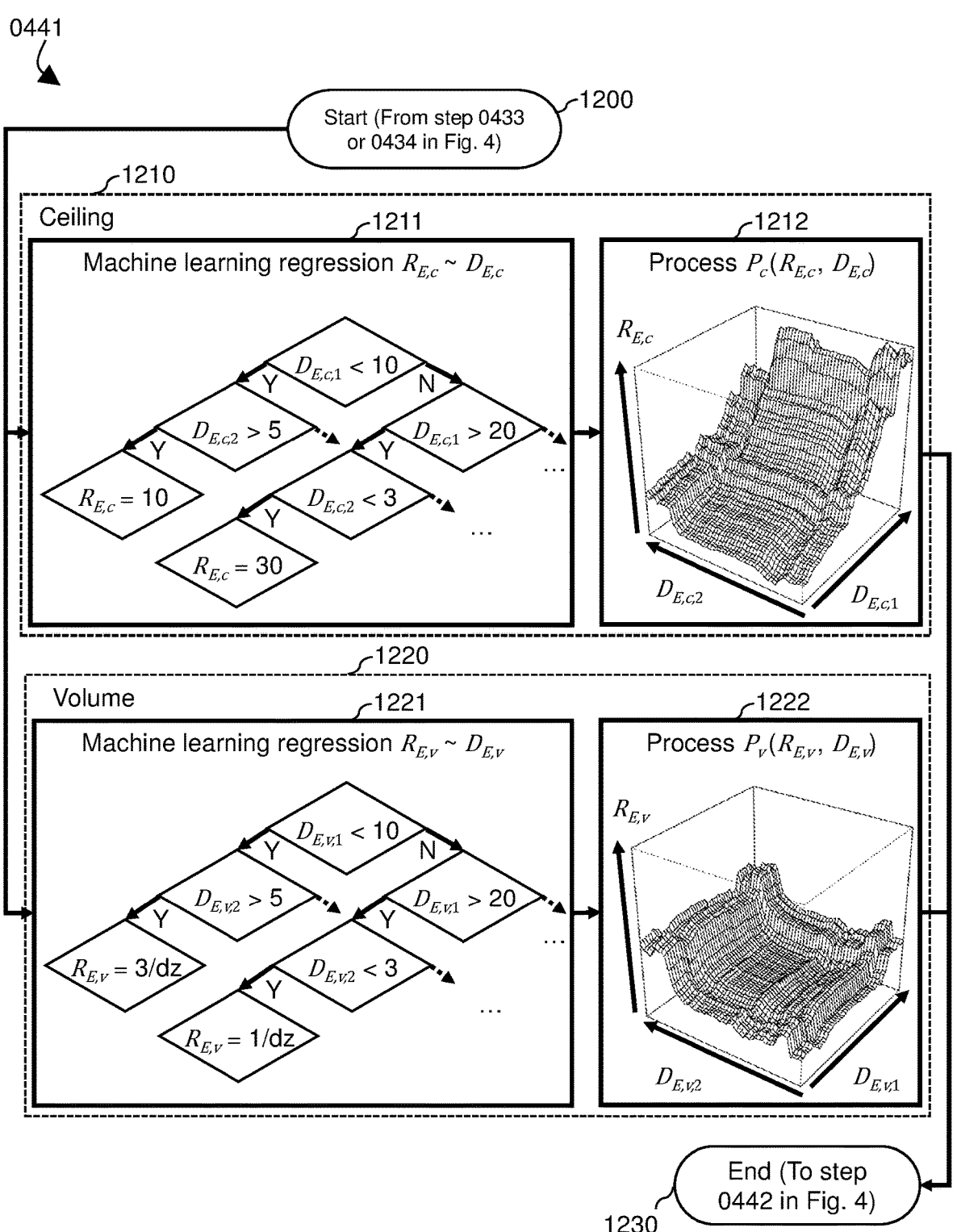
FIG. 15 details step 0441 (Generate driver-response process model) in FIG. 4 and shows how the driver-response relationship models can be created in Eulerian coordinate representation.

Continuing with the method illustrated in FIG. 1, machine learning and other techniques capable of being understood by those skilled in the art (such as least squares multivariate regression) can be used to generate a driver-response process model 0140 from the space and time aligned dataset 1151D. The structure of the process model 0140 results from the responses and drivers chosen to represent a law of science. For example, if the environmental response input data 0110 are $H_2O$ flux responses they can be related through Fick's first law of diffusion to a humidity gradient driver. In this specific example, machine learning (and other techniques) can be used to determine the $H_2O$ turbulent diffusion coefficient as a space-varying and time-varying, multi-variate and co-dependent function of solar radiation as a time driver (measured at 0122) representing energy input, humidity as a time driver (measured at 0122) representing atmospheric vapor pressure deficit, and vegetation greenness space driver (measured at 0121) representing surface available moisture, accompanied by modulating drivers such as temperature (measured at 0120). The result is a driver-response process model across the range of intersected responses and drivers in the space and time aligned dataset 1151D used for machine learning. FIG. 15 provides additional detail. Among others, the generated driver-response process model can be used directly to benchmark other, existing process models.

Figure 16:
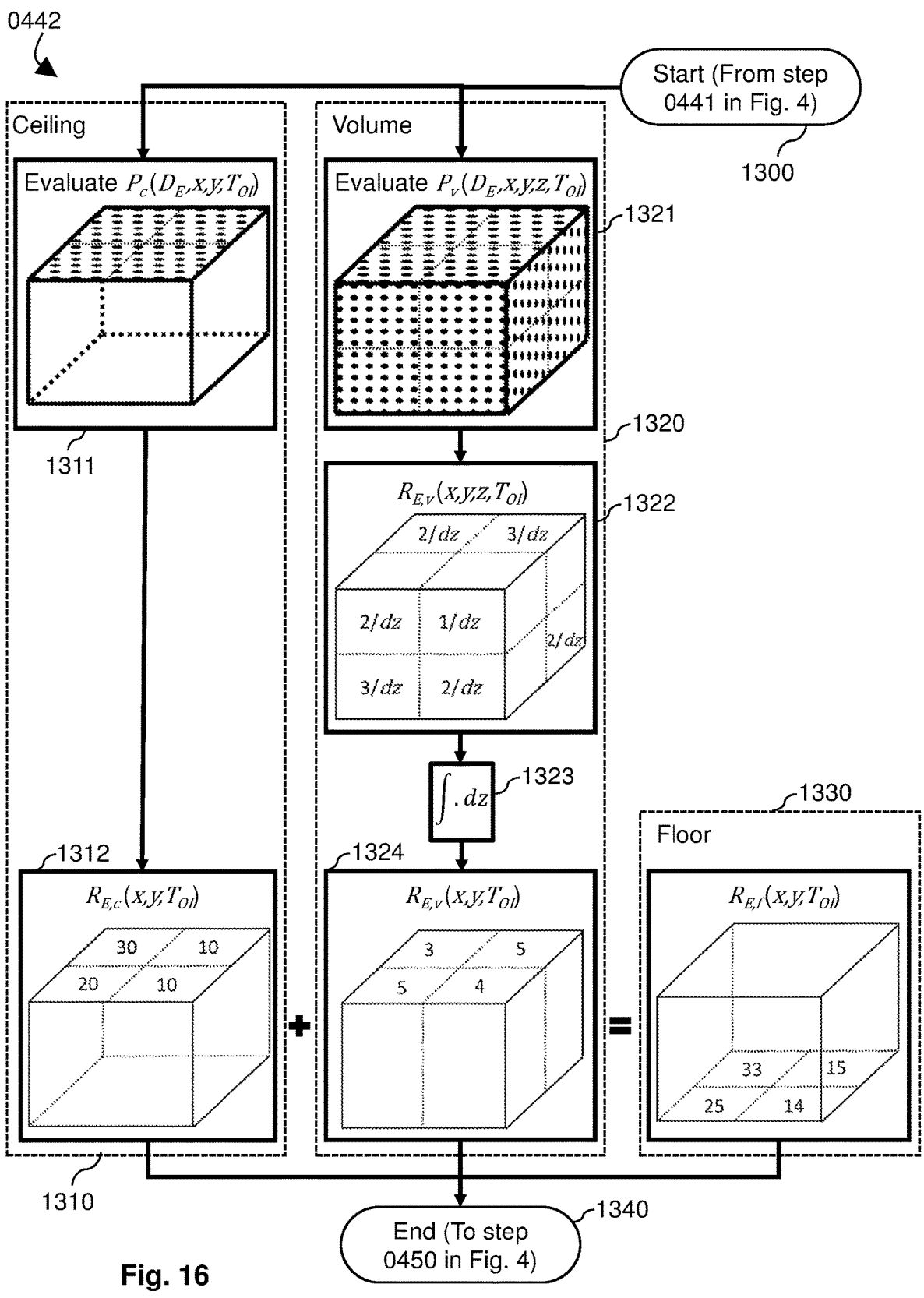
FIG. 16 details step 0442 (Produce enhanced space-time-resolved responses) in FIG. 4 and shows how the driver-response relationship models shown in FIG. 15 are evaluated in conjunction with a physical constraint, shown in FIG. 6 and FIG. 7, to produce the enhanced space-time-resolved responses in Eulerian coordinate representation.

Finally, in 0150 the system produces the space-time resolved environmental responses 1330 by applying the generated driver-response process model 0140 to the jointly space-time resolved environmental driver information 0120 that are stored in the space aligned and time aligned data table 1151D, which is explained in detail in FIG. 16. First the space-resolved and time-resolved ceiling responses and volume responses 0151 are produced, which are then combined to the space-resolved and time-resolved responses from the floor of the volume 1330 per conservation equation in FIG. 6 and FIG. 7 and described in detail later in the document. In result, the expensive information from the sparse environmental response measurements 0110, which is encoded in the driver-response model 0140, is projected across the target coordinate representation, space and time extent, resolution, and coverage of the environmental driver measurements 0120. This reduces the cost per unit space and time for obtaining environmental responses compared to their measurement 0110 alone. In the current example, the resulting Eulerian fixed-frame coordinate representation 1330 improves interoperability with other environmental measurements and models, and reduces uncertainty through explicitly addressing all terms in the conservation equation as shown in FIG. 6 and FIG. 7 that underlies the $H_2O$ flux response measurements 0110.

Referring generally to the method illustrated in FIG. 1, it should be noted that environmental drivers, such as those illustrated and described with reference to 0120, and environmental responses, such as those illustrated and described with reference to 0110, can originate from instruments on stationary and/or moving measurement platforms alike. These platforms include but are not limited to the object of observation itself such as soil or trees, human observers, towers, buoys, balloons, dropsondes, and/or manned or unmanned vessels, aircraft, and satellites. Furthermore, the environmental drivers 0120 and environmental responses 0110 do not necessarily need to originate directly from measurement instruments. Such environmental drivers 0120 and environmental responses 0110 can also be outputs of computer models, e.g. the re-analysis of weather data that was collected by various means. Furthermore, environmental driver input data 0120 and environmental response input data 0110 can be combined among multiple, similar or different measurement platforms and/or computer models. The outputs of the foregoing steps 0140 and 0150 can be used for control as shown at 0160 and described in detail in FIG. 18.

FIG. 2A, FIG. 2B show examples of how environmental response input data can be generated. In-situ environmental response measurements such as shown at 0207, 0208A and 0208B from environmental response measurement instruments at 0202, 0205A and 0205B capture a wide range of physical phenomena but are often expensive and/or unfeasible to measure with sufficient resolution, extent and coverage in space and/or time. For measurements from towers as shown at 0201 the environmental hardening required for automated deployment and operational expenses can be cost-prohibitive. The same constraint applies to deployment of such measurement instruments in other ways than towers, such as ships, buoys, aircraft, etc. Examples of typical instruments used for such automated deployments include 3-dimensional sonic anemometers (e.g., CSAT-3; Campbell Scientific, Inc.; Logan, Utah) in combination with a $CO_2$/$H_2O$ infrared gas analyzer (e.g., LI-7200; LI-COR, Inc.; Lincoln, Nebraska). Similarly, the manual labor cost for human observers as shown at 0204A, 0204B can be cost-prohibitive. Examples for typical instruments used by human observers include a portable $CO_2$/$H_2O$ infrared gas analyzer (e.g., LI-870; LI-COR, Inc.; Lincoln, Nebraska), and a portable optical gas imaging camera (e.g., GF620; FLIR Systems, Inc.; Wilsonville, Oregon). Also, the number of deployments necessitated by the limited and varying resolution, extent and coverage in space and/or time of each measurement as shown at 0203A, 0203B, 0206A and 0206B can be cost-prohibitive. Specifically, the surface influence function of the tower-mounted in-situ measurements shown at 0203A can aggregate in space over irregular, changing surface areas as a function of wind direction and other environmental factors, shown at 0203B. This characteristic is signified by the different response measurement values $29=R_L(T_{OI}=1)$ at 0207A in FIG. 2A, and $35=R_L(T_{OI}=2)$ at 0207B in FIG. 2B. Similarly, the surface influence function of the human observer in-situ measurement shown at 0206A can aggregate in space over surface areas that are smaller in comparison to the automated tower measurements and change as a function of observer location shown at 0206B. It is important to note that certain types of environmental response input data become accessible also by proximal- and remote-sensing technologies, resolved in space and/or resolved in time. Examples include but are not limited to 3-dimensional wind Doppler light detection and ranging (e.g., StreamLine XR; Halo Photonics; Worcester, United Kingdom), and water vapor and temperature Raman light detection and ranging (e.g., SRLID; Atmospheric Radiation Measurement; Richland, Washington). The minimum requirement for environmental response input data is that they are sufficiently resolved in space and/or in time to generate a clear representation of the physical phenomena under investigation.

FIG. 3A, FIG. 3B, FIG. 3C, and FIG. 3D show detailed examples of how environmental driver input data can be generated as illustrated at 0121 and 0122 in FIG. 1. Remote sensing measurements of space-resolved environmental drivers from aircraft such as shown at 0301A, 0301B and from satellites such as shown at 0304A, 0304B, 0304C, and automated in-situ measurements of time-resolved environmental drivers from a tower as shown at 0307C, capture only a subset of physical phenomena compared to the environmental response measurements, but are often comparatively easy, quick and inexpensive to measure at high resolution, extent and coverage in space and/or time. Examples for typical instruments used at 0302A, 0302B, 0305A, 0305B, and 0305C include a discrete return Doppler light detection and ranging (e.g., ALTM Gemini; Optech, Inc.; Vaughan, Ontario, Canada) and an imaging spectrometer (e.g., AVIRIS-NG; California Institute of Technology; Pasadena, California). The regular surface influence function of the aircraft and satellite operated remote sensing measurements shown at 0303A, 0303B, 0306A, 0306B, and 0306C results solely from line-of-sight geolocation and thus resolves individual surface areas spatially in Eulerian coordinate representation. This surface influence function can change as a function of aircraft location 0301A versus 0301B, as shown at 0302A versus 0302B and 0303A versus 0303B, and similarly as a function of satellite location 0304A versus 0304B versus 0304C, as shown at 0305A versus 0305B versus 0305C and 0306A versus 0306B versus 0306C. Examples for typical instruments 0308 and 0308C used for automated in-situ measurements of time-resolved environmental driver values (0312C and 0312D) include a humidity and temperature probe (e.g., HMP155; Vaisala; Vantaa, Finland) and a $CO_2$/$H_2O$ infrared gas analyzer (e.g., LI-850; LI-COR, Inc.; Lincoln, Nebraska). The irregular surface influence function of the tower operated in-situ measurements shown at 0309C and 0309D aggregates spatially over individual surface areas in Lagrangian coordinate representation, as referred to earlier when introducing also 0203 in FIG. 1, 0203A in FIG. 2A, 0203B in FIG. 2B, 0309 in FIG. 1, 0309C in FIG. 3C, and 0309D FIG. 3D. This surface influence function can change as a function of wind direction and other environmental factors as shown at 0309C versus 0309D, similar but not necessarily identical to the response measurement surface influence function as shown at 0203A versus 0203B in FIG. 2A and FIG. 2B. It is important to note that certain types of environmental driver input data become accessible also by proximal- and remote-sensing technologies, resolved in space and/or resolved in time. Examples include but are not limited to 3-dimensional wind Doppler light detection and ranging (e.g., StreamLine XR; Halo Photonics; Worcester, United Kingdom), and water vapor and temperature Raman light detection and ranging (e.g., SRLID; Atmospheric Radiation Measurement; Richland, Washington). The minimum requirements for environmental driver input data are:

(a) For space-resolved environmental response output data assuming quasi-stationarity in time, that at least one driver is sufficiently resolved in space to generate a clear spatial representation of the physical phenomena under investigation.

(b) For time-resolved environmental response output data assuming quasi-homogeneity in space, that at least one driver is sufficiently resolved in time to generate a clear temporal representation of the physical phenomena under investigation.

(c) For space-resolved and time-resolved environmental response output data, that at least one driver is sufficiently resolved in space, and at least one driver is sufficiently resolved in time, to jointly generate a clear spatiotemporal representation of the physical phenomena under investigation.

FIG. 4 illustrates an overall process for complementing space-aggregated/time-resolved, sparse and expensive environmental response measurements 0110 in FIG. 1 with jointly space-time resolved, abundant and inexpensive environmental driver measurements 0120 in FIG. 1. The process shown in FIG. 4 encompasses the items shown as processors at 0130, 0140 and 0150 in FIG. 1. It should be noted that processors can mean processing steps as well as processing elements, and that processor can refer to a section of computer code. The process itself consists of four main processors to prepare inputs 0410, to align time representation 0420, to align space representation 0430, and to produce outputs 0440. The combination of the prepare inputs 0410, align time representation 0420, and align space representation 0430 processors produce the space and time aligned dataset 1151D, shown in FIG. 1. Below steps 0411-0422 detail step 0131 in FIG. 1, and below steps 0431-0434 detail step 0132 in FIG. 1.

Referring to processor 0410 in FIG. 4, the process to prepare inputs commences with getting user specifications 0411, as will be further detailed with reference to FIG. 5; then to determine the align parameters 0412A, as will be further detailed with reference to FIG. 8, and to determine output parameters 0412B, as will be further detailed with reference to FIG. 9. Next, the process tests the tolerances 0413 specified as part of the user specifications 0411. If the tolerances are achievable, the process obtains input data 0414 which are shown as response input data 0110, space driver input data 0121 and time driver input data 0122 in FIG. 1, or requests user intervention otherwise 0416. Next, the process tests whether all required elements are present 0415 in the user specifications 0411, align parameters 0412A, output parameters 0412B, and input data 0414. If all required elements are present, the process prepares the input data 0417 as further detailed in FIG. 10, or requests user intervention otherwise 0416.

Referring to processor 0420 in FIG. 4, the process to align time representation first obtains all univariate time-series from the prepared input data 0417 above, also shown at 0110 and 0122 in FIG. 1. A time-domain box filter can be used to calculate the space-aggregated/time-resolved drivers 0421 as further detailed in FIG. 11, such as air temperature and humidity at the time align resolution $T_{AR}$ for each time align interval $T_{AI}$ over the time output interval $T_{OI}$, alongside wind direction for use in the align space representation processor 0430 below. Expanding the use of the box filter to the time-frequency domain yields the space-aggregated/time-resolved responses 0422, such as the $H_2O$ flux for the same $T_{AR}$, $T_{AI}$ and $T_{OI}$ as the meteorological states above. First the base states for all univariate time-series are calculated and subtracted over $T_{OI}$. In step 0411 above the user can chose between arithmetic mean, linear trend and polynomial base states. Next, the process uses time-frequency decomposition such as Wavelets to decompose the univariate time-series into time-frequency signal pairs at the time resolution native to the environmental response measurements 0110. From these the time-frequency-resolved variances (here: Wavelet scalograms) and co-variances (here: Wavelet cross-scalograms) are calculated, and corrected with a transfer function for high-frequency spectral loss. Next, the process integrates the corrected time-frequency-resolved variances and co-variances across the frequency-domain, which yields variance and co-variance time-series still at the time resolution native to the environmental response measurement 0110. Finally, the same time-domain box filter as in step 0421 is used to yield the space-aggregated/time-resolved environmental responses such as $H_2O$ flux for the same $T_{AR}$, $T_{AI}$ and $T_{OI}$ as the space-aggregated/time-resolved environmental drivers 0421 above, alongside turbulence statistics for use in the align space representation processor 0430 below.

Referring to the align space representation processor 0430 in FIG. 4, the process produces the space-aligned and time-aligned data table was also shown at 1151D in FIG. 1. The process first obtains the space-resolved/time-aggregated environmental drivers from step 0414, also shown at 0121 in FIG. 1, the space-aggregated/time-resolved environmental drivers from step 0421, also shown at 1040 in FIG. 11, and the space-aggregated/time-resolved environmental responses from step 0422, also shown at 0110 in FIG. 1. The processor 0430 then commences with the step of deconvolving the space-aggregated response, here the $H_2O$ flux in Lagrangian coordinate representation, to an initial space and time aligned data table 1151A in FIG. 12 in the Eulerian coordinate representation of the space-resolved drivers, as shown at 0431 and further detailed in FIG. 12. Next, the space-resolved drivers are joined to produce an intermediary space and time aligned data table 1151B and 1151C in FIG. 13, as shown at 0432 and further detailed in FIG. 13. Then, the process branches based on a time-resolved drivers lookup, as shown at 0433. If this lookup 0433 returns a "no" (false), the process moves directly to the generate drivers-response process model step 0441 as part of the produce outputs processor 0440. If this lookup 0433 returns a "yes" (true) the process includes joining the time-resolved drivers into a final space and time aligned data table 1151D in FIG. 14, as shown at 0434 and further discussed with reference to FIG. 14. It should be noted that the relative positions of space-resolved drivers 0432 and time-resolved drivers 0434 in the sequence shown in 0430 can be reversed depending on the user specification of either space-resolved, or time-resolved, or space-resolved and time-resolved environmental response output data. This reduces the number of environmental drivers necessary to achieve a defined performance, and thus yields parsimonious solutions that minimize requirements on input data and computational resources.

Figure 13:
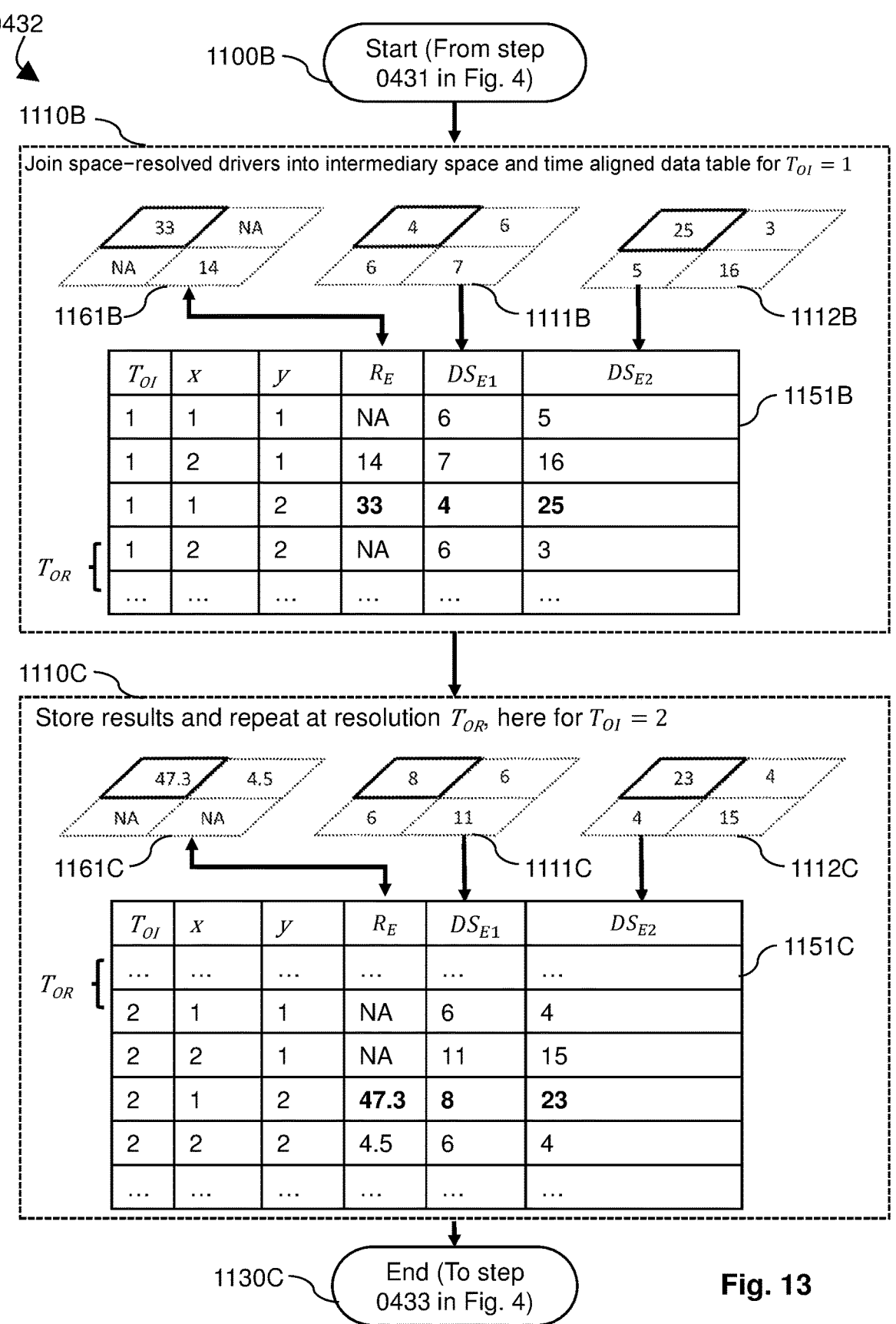
FIG. 13 details step 0432 (Join space-resolved drivers into space and time aligned data table) in FIG. 4 and shows how the space-resolved drivers can be joined into an intermediary space and time aligned data table in Eulerian coordinate representation.
Figure 14:
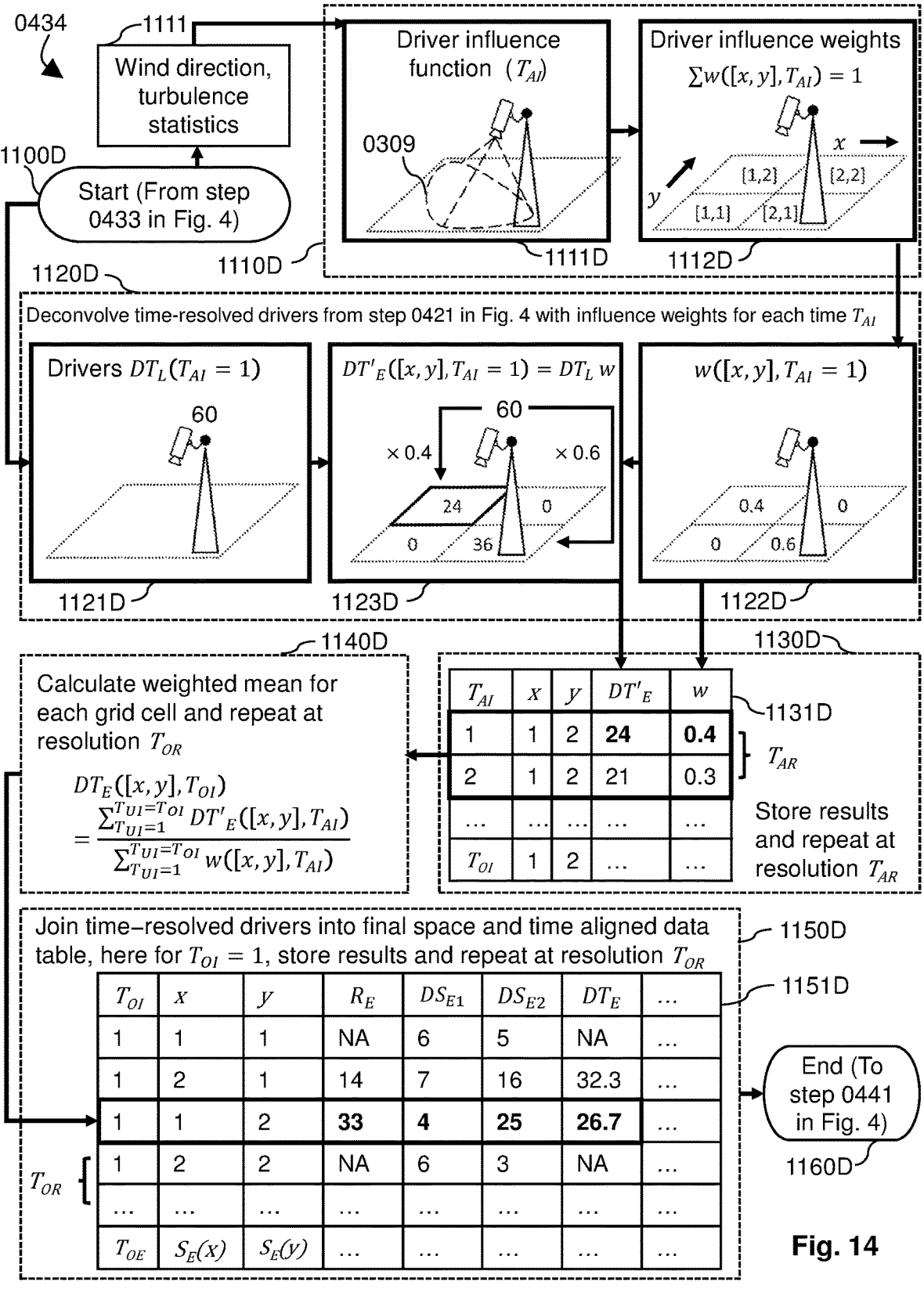
FIG. 14 details step 0434 (Join time-resolved drivers into space and time aligned data table) in FIG. 4 and shows how the time-resolved drivers can be joined into the final space and time aligned data table in Eulerian coordinate representation through georeferencing.

Referring to the produce outputs processor 0440 in FIG. 4, if the time-resolved drivers lookup 0433 is disabled, the process first obtains the intermediary space and time aligned data table 1151B and 1151C in FIG. 13 from step 0433, or otherwise the final space and time aligned data table 1151D in FIG. 14 from step 0434. The following example continues with the final space and time aligned data table 1151D in FIG. 14 from step 0434, which was also shown at 1151D in FIG. 1. Machine learning (or other techniques capable of being understood by anyone skilled in the art) can then be used to generate the multi-variate and co-dependent driver-response process model 0441, which was illustrated at 0140 in FIG. 1 and will be explained in greater detail in FIG. 15, across the range of environmental responses and drivers in the space-aligned and time-aligned data table 1151D (that was also shown at 1151D in FIG. 1). The process then produces the enhanced space-time resolved environmental responses 0442 (which was also illustrated at 0150 in FIG. 1) by applying the generated driver-response process model 0441 to the jointly space-time resolved environmental driver information 0120 in FIG. 1 that are stored in the space aligned and time aligned data table 1151D. This process of generating the enhanced time and space resolved responses 0442 (which is also called the environmental response output data 1330 in FIG. 1) This completes the produce outputs processor 0440 and the overall process illustrated in FIG. 4 ends at step 0450 and returns to step 0160 in FIG. 1.

Figure 5:
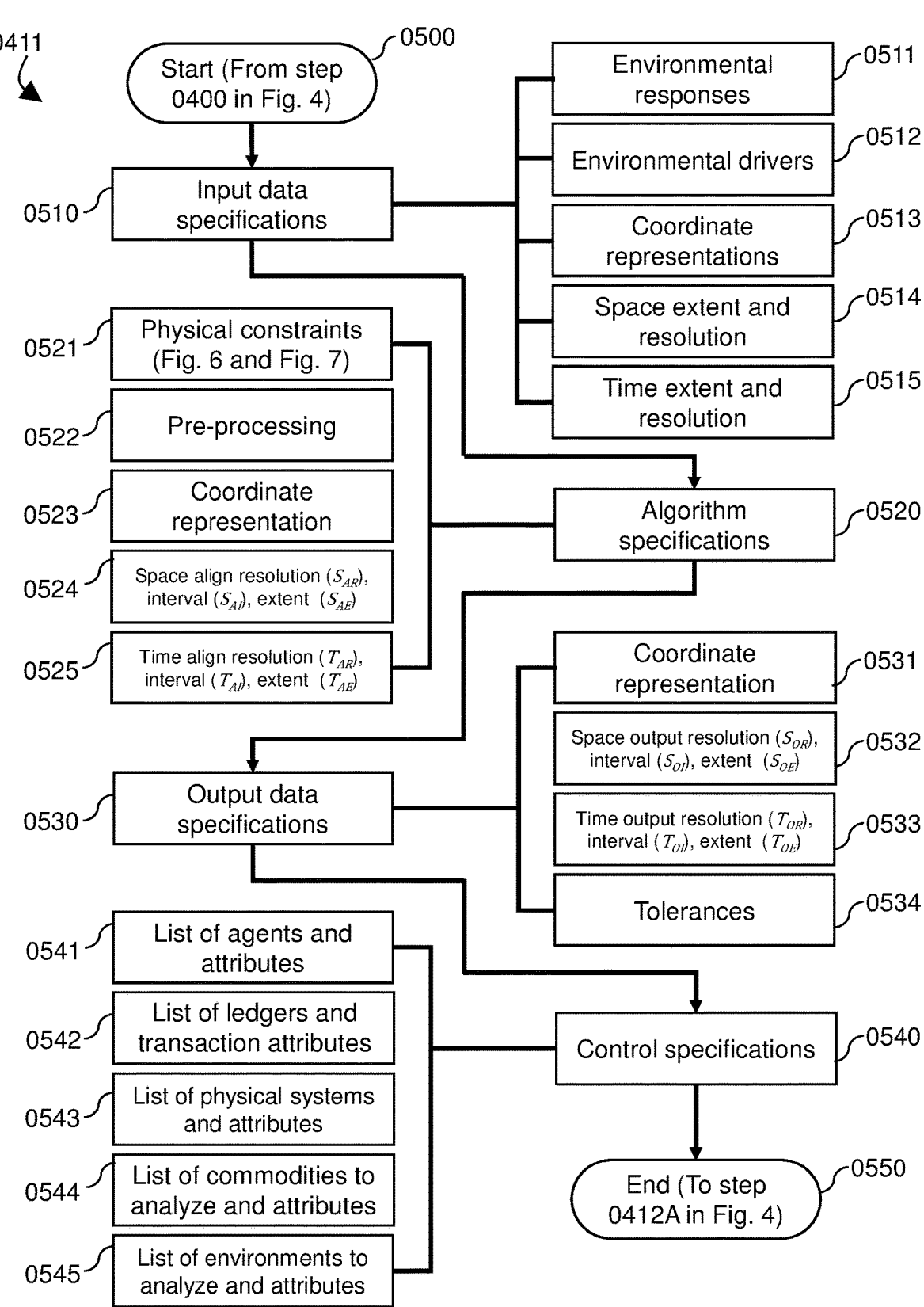
FIG. 5 details step 0411 (Get user specifications) of FIG. 4.

FIG. 5 illustrates an overall process for getting user specifications, which encompasses the items shown at 0400, 0411 and 0412A in FIG. 4. The process itself consists of the four processors to obtain input data specifications 0510, algorithm specifications 0520, output data specifications 0530, and control specifications 0540.

Referring to step 0510 in FIG. 5, the process to obtain input data specifications includes but is not limited to defining environmental responses 0511, environmental drivers 0512, their respective coordinate representations 0513, as well as their respective resolutions and extents in space 0514 and time 0515.

Figure 7:
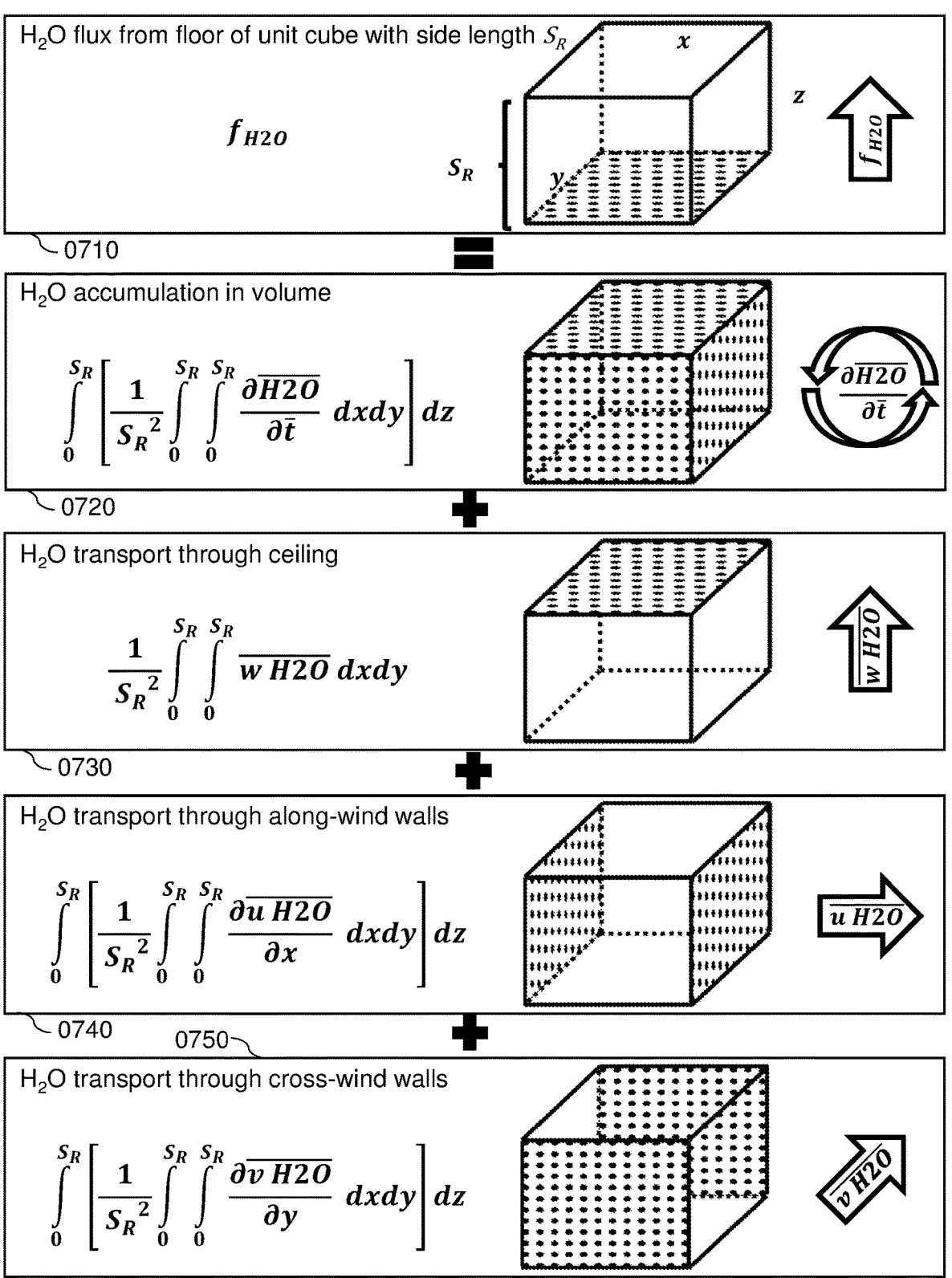
FIG. 7 shows how a physical constraint is constructed based on a law of science, using an $H_2O$ flux conservation equation as an example.

Referring to step 0520 in FIG. 5, the process to obtain algorithm specifications commences with defining physical constraints 0521 based on laws of science and existing mathematical models, for which a detailed example is given in FIG. 6 and FIG. 7. Additional algorithm specifications include but are not limited to parameters for pre-processing 0522, including parameters for range test, persistence test, step test, spike test, acceptable data fraction, streamline rotation, regularization, time synchronization, and definition of synthetic variables, as detailed in FIG. 9. Next, the coordinate representation 0523 including type of drivers 0433 in FIG. 4 to include in the space and time aligned data table are defined. Then space-align resolution ($S_{AR}$), interval ($S_{AI}$), and extent ($S_{AE}$) are specified, as shown at 0524; and time-align resolution ($T_{AR}$), interval ($T_{AI}$), and extent ($T_{AE}$) are specified, as shown at 0525.

Referring to step 0530 in FIG. 5, the process to obtain output data specifications includes but is not limited to defining the output coordinate representation 0531, space output resolution ($S_{OR}$), interval ($S_{OI}$), and extent ($S_{OE}$) as shown at 0532; time output resolution ($T_{OR}$), interval ($T_{OI}$), and extent ($T_{OE}$) as shown at 0533; as well as output data tolerances 0534.

Referring to step 0540 in FIG. 5, the process to obtain control specifications includes but is not limited to defining the list of agents and attributes 0541, the list of ledgers and transaction attributes 0542, the list of physical systems and attributes 0543, the list of commodities to analyze and attributes 0544, and the list of environments to analyze and attributes 0545. The overall process for getting user specifications ends at step 0550 and returns to step 0412A in FIG. 4.

FIG. 6 illustrates how space-time deconvolution and subsequent ensembling reduce the $H_2O$ flux conservation equation to two differential equation terms that are fully quantifiable through the systems and methods described in this invention, thus order-of-magnitude improving tolerances compared to the prior art. The method shown in FIG. 6 applies to the items shown as processor at 0150 in FIG. 1, and steps 0441 and 0442 in FIG. 4. The method itself consists of three main processors, the full $H_2O$ flux conservation equation for a single unit cube 0610, canceling horizontal transport terms in an ensemble of unit cubes 0620, and canceling horizontal-compensatory fluxes in an ensemble of unit cubes 0630, resulting in the reduced $H_2O$ flux conservation equation for an ensemble of unit cubes. The method commences with the full $H_2O$ flux conservation equation for a single unit cube 0610, which is further detailed in FIG. 7.

Space ensembling the horizontal transport terms over many unit cubes then effectively cancels them from the $H_2O$ flux conservation equation 0620. This is achieved through constructing a square grid of N× N unit cubes with a single vertical layer 0621. With increasing N the relative contribution of $H_2O$ transport through the along-wind and cross-wind walls to the $H_2O$ flux conservation equation trends towards zero 0622. Considering all terms in the $H_2O$ flux conservation equation for a unit cube 0610 being of similar magnitude, the tolerance in cancelling the horizontal transport terms 0623 is proportional to the fractional area they represent in the N×N ensemble.

The full $H_2O$ flux conservation equation for a single unit cube 0610, which is further detailed in FIG. 7, further shows that any non-zero horizontal transport results in corresponding changes in the remaining two differential equation terms. Such horizontal-compensatory fluxes however do not originate from within the unit cube, and would thus falsify estimation of the net $H_2O$ flux after dropping the horizontal transport terms 0622. Space ensembling the remaining terms $H_2O$ accumulation in volume and $H_2O$ transport through ceiling over many unit cubes 0631 also effectively cancels these horizontal-compensatory fluxes 0630, as exemplified here for the environmental response output data 1330 also shown in FIG. 1 and FIG. 16. This yields the reduced $H_2O$ flux conservation equation for an ensemble of unit cubes 0632, which terms are fully quantifiable through the systems and methods described in this invention, thus order-of-magnitude improving tolerances compared to existing approaches. The tolerance in canceling the horizontal-compensatory fluxes 0633 is proportional to the standard error of their ensemble mean trending towards zero, as a function of number of unit cubes in the ensemble $N^2$.

FIG. 7 illustrates how a physical constraint is constructed based on a law of science, encompassing the item shown at 0610 in FIG. 6. Specifically, in this example a constraint on the flux of $H_2O$ from the floor of a unit cube 0710 is constructed from the law of conservation of mass. In this $H_2O$ flux conservation equation, the flux of $H_2O$ from the floor of a unit cube 0710 can be expressed as the sum of $H_2O$ accumulation in the unit cube volume 0720, $H_2O$ transport through the unit cube ceiling 0730, $H_2O$ transport through the unit cube along-wind walls 0740, and $H_2O$ transport through the unit cube cross-wind walls 0750.

Figure 8:
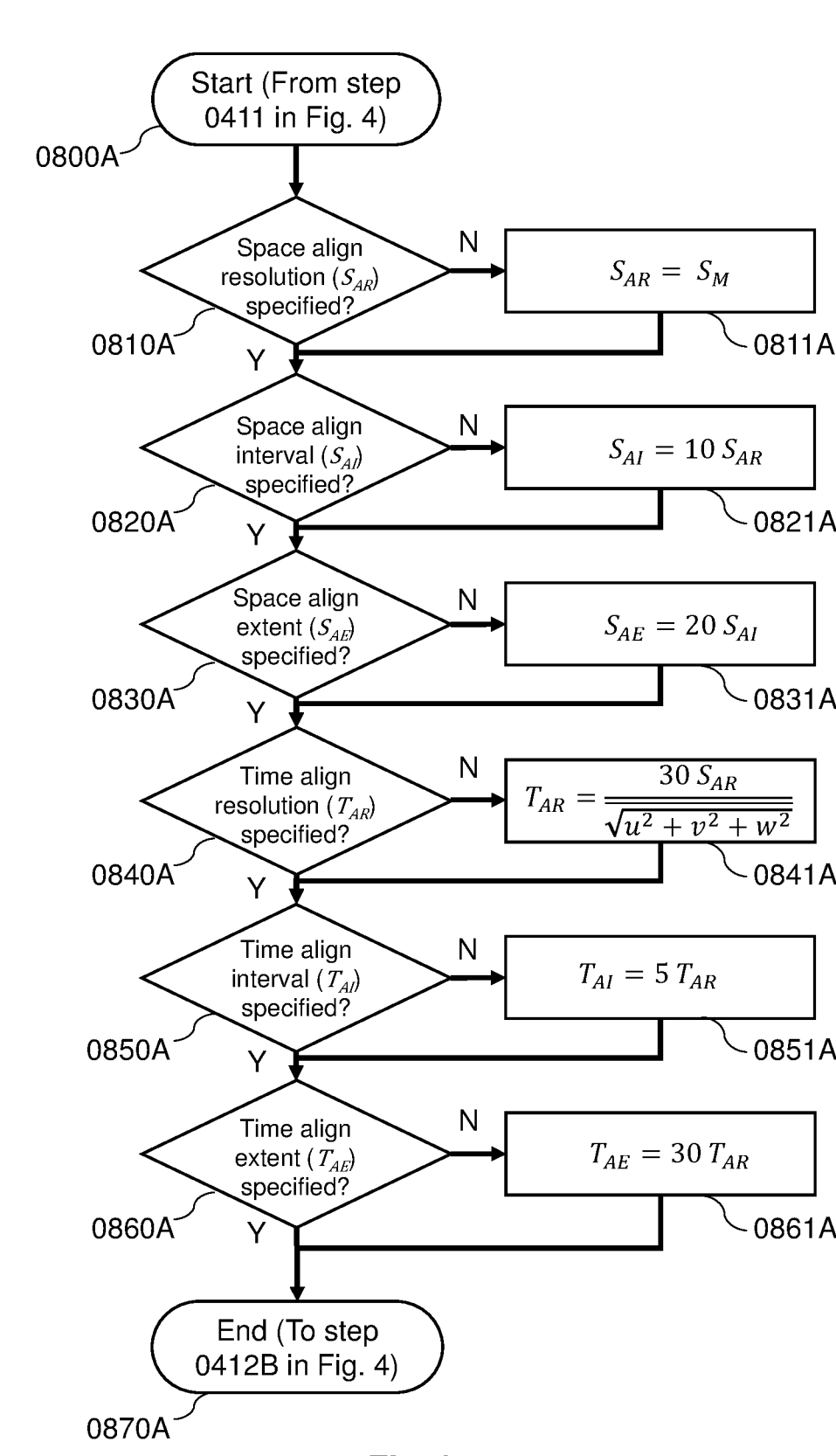
FIG. 8 details step 0412A (Determine align parameters) in FIG. 4 and shows the default settings of space and time alignment parameters for the execution of one embodiment of the inventions described herein.

FIG. 8 illustrates the default settings of the space and time align parameters required for the execution of the systems and methods described in this invention, if they are not already present in the user specifications 0411 in FIG. 4, and FIG. 5. The method shown in FIG. 8 applies to the items shown as steps 0411, 0412A and 0412B in FIG. 4. The method commences with obtaining the user specifications from step 0411 in FIG. 4 as part of 0800A. The space align resolution lookup 0810A then queries the user specifications as part of 0800A. If the space align resolution ($S_{AR}$) is not already present in the user specifications as part of 0800A, the method assigns the height above exchange surface of the $H_2O$ transport through ceiling measurement ($S_M$) as the default space align resolution ($S_{AR}$) 0811A. Next, the space align interval lookup 0820A queries the user specifications as part of 0800A. If the space align interval ($S_{AI}$) is not already present in the user specifications as part of 0800A, the method calculates and assigns a default space align interval ($S_{AI}$) 0821A as a function of the space align resolution ($S_{AR}$). Next, the space align extent lookup 0830A queries the user specifications as part of 0800A. If the space align extent ($S_{AE}$) is not already present in the user specifications as part of 0800A, the method calculates and assigns a default space align extent ($S_{AE}$) 0831A as a function of the space align interval ($S_{AI}$). Next, the time align resolution lookup 0840A queries the user specifications as part of 0800A. If the time align resolution ($T_{AR}$) is not already present in the user specifications as part of 0800A, the method calculates and assigns a default time align resolution ($T_{AR}$) 0841A as function of the along-(u), cross-(v) and vertical-(w) wind components and the space align resolution ($S_{AR}$). Next, the time align interval lookup 0850A queries the user specifications as part of 0800A. If the time align interval ($T_{AI}$) is not already present in the user specifications as part of 0800A, the method calculates and assigns a default time align interval ($T_{AI}$) 0851A as a function of time align resolution ($T_{AR}$). Next, the time align extent lookup 0860A queries the user specifications as part of 0800A. If the time align extent ($T_{AE}$) is not already present in the user specifications as part of 0800A, the method calculates and assigns a default time align extent ($T_{AE}$) 0861A as a function of the time align interval ($T_{AI}$). The method completes with providing the user specifications as part of 0800A alongside any calculated and assigned default align parameters to the next step in the process 0412B in FIG. 4 as shown at step 0870A, and further detailed in FIG. 9.

Figure 9:
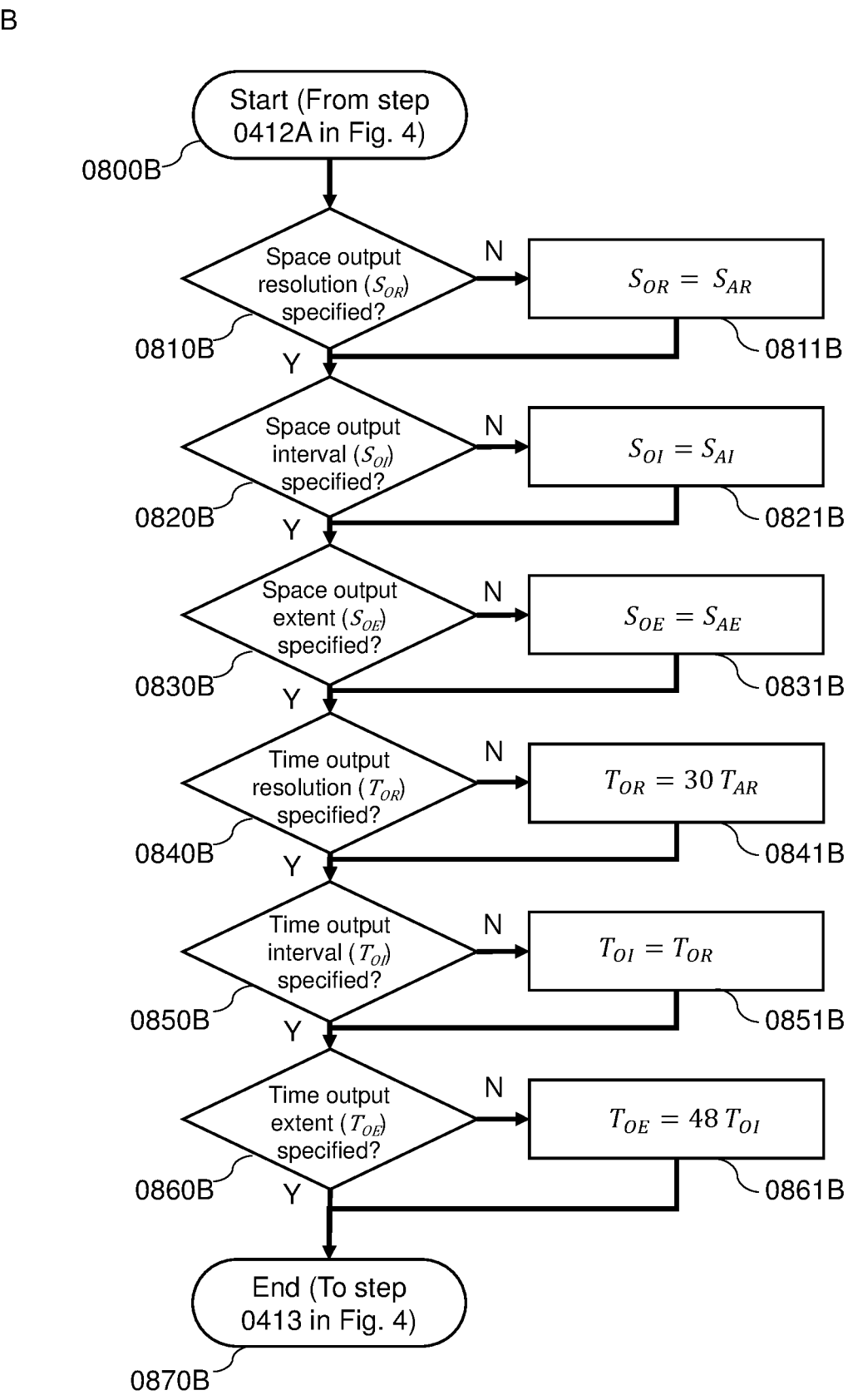
FIG. 9 details step 0412B (Determine output parameters) in FIG. 4 and shows the default settings of space and time output parameters for the execution of one embodiment of the inventions described herein.

FIG. 9 illustrates the default settings of the space and time output parameters required for the execution of the systems and methods described in this invention, if they are not already present in the user specifications 0411 in FIG. 4, and FIG. 5. The method shown in FIG. 9 applies to the items shown as steps 0412A, 0412B and 0413 in FIG. 4. The method commences with obtaining the user specifications from step 0411 in FIG. 4 alongside any calculated and assigned default align parameters from step 0412A in FIG. 4B and FIG. 8 as part of 0800B. The space output resolution lookup 0810B then queries the user specifications as part of 0800B. If the space output resolution ($S_{OR}$) is not already present in the user specifications as part of 0800B, the method assigns the space align resolution ($S_{AR}$) as the default space output resolution ($S_{OR}$) 0811B. Next, the space output interval lookup 0820B queries the user specifications as part of 0800B. If the space output interval ($S_{OI}$) is not already present in the user specifications as part of 0800B, the method assigns the space align interval ($S_{AI}$) as the default space output interval ($S_{OI}$) 0821B. Next, the space output extent lookup 0830B queries the user specifications as part of 0800B. If the space output extent ($S_{OE}$) is not already present in the user specifications as part of 0800B, the method assigns the space align extent ($S_{AE}$) as a default space output extent ($S_{OE}$) 0831B. Next, the time output resolution lookup 0840B queries the user specifications as part of 0800B. If the time output resolution ($T_{OR}$) is not already present in the user specifications as part of 0800B, the method calculates and assigns a default time output resolution ($T_{OR}$) 0841B as function of the time align resolution ($T_{AR}$). Next, the time output interval lookup 0850B queries the user specifications as part of 0800B. If the time output interval ($T_{OI}$) is not already present in the user specifications as part of 0800B, the method assigns the time output resolution ($T_{OR}$) as a default time output interval ($T_{OI}$) 0851B. Next, the time output extent lookup 0860B queries the user specifications as part of 0800B. If the time output extent ($T_{OE}$) is not already present in the user specifications as part of 0800B, the method calculates and assigns a default time output extent ($T_{OE}$) 0861B as a function of the time output interval ($T_{OI}$). The method completes with providing the user specifications as part of 0800B alongside any calculated and assigned default align parameters from step 0412A in FIG. 4 and calculated and assigned default output parameters to the next step in the process 0413 in FIG. 4 as shown at step 0870B.

Figure 10:
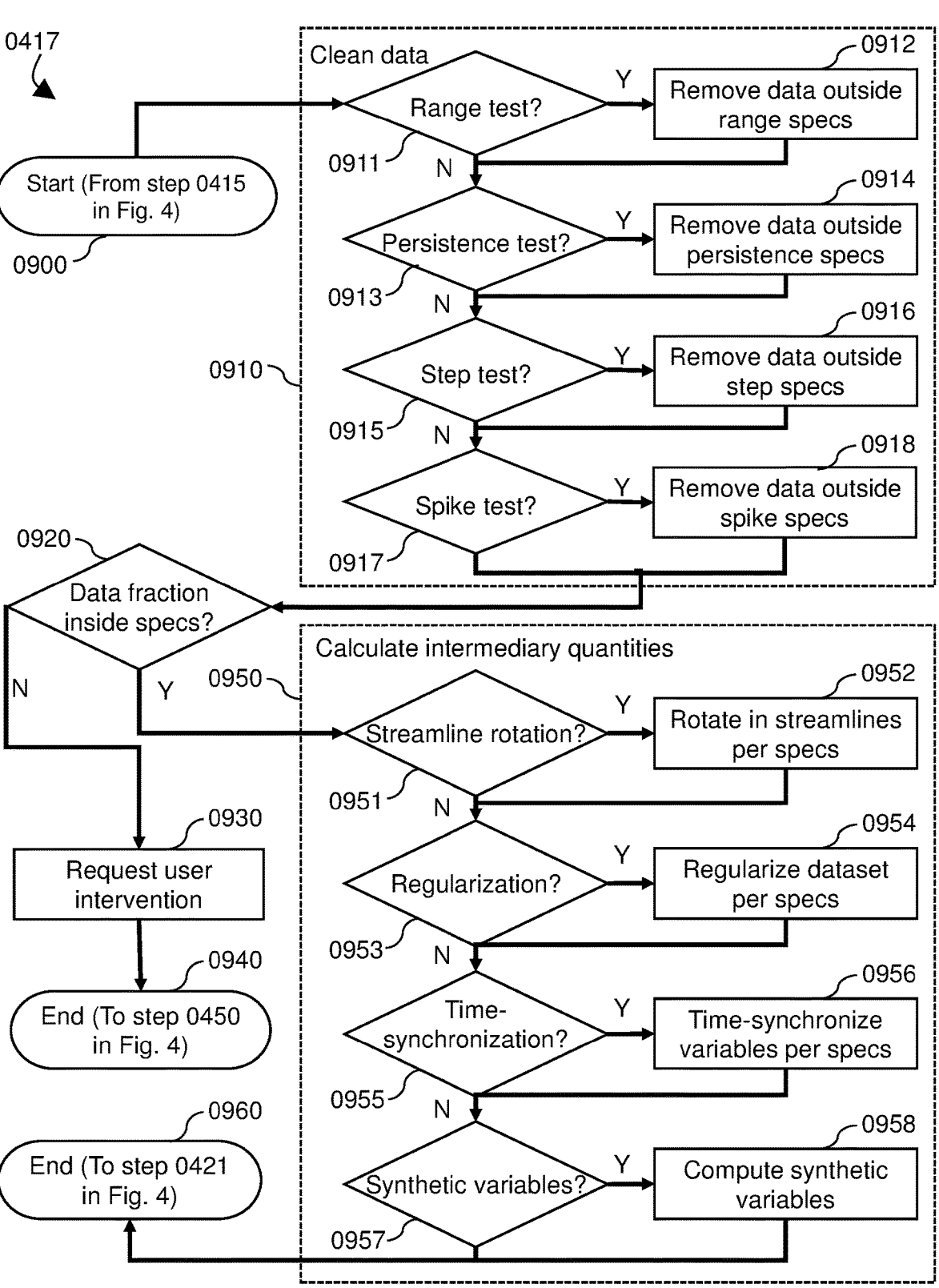
FIG. 10 details step 0417 (Prepare input data) in FIG. 4 and shows the input data preparation for the execution of the systems and methods described in this invention.

FIG. 10 illustrates the input data preparation for the execution of the systems and methods described in this invention. The method shown in FIG. 10 applies to the items shown as steps 0415, 0417 and 0421 in FIG. 4. The method itself consists of two main processors, to clean the input data 0910, and to calculate intermediary quantities 0950. The method commences with obtaining the user specifications from step 0411 in FIG. 4 as part of 0900.

Further referring to FIG. 10, in processor 0910 the range test lookup 0911 first queries the user specifications as part of 0900 from step 0411 in FIG. 4. If the range test is selected, data outside the user specifications are removed at 0912, or no data is removed otherwise. Next, the persistence test lookup 0913 queries the user specifications as part of 0900. If the persistence test is selected, data outside the user specifications are removed at 0914, or no data is removed otherwise. Next, the step test lookup 0915 queries the user specifications as part of 0900. If the step test is selected, data outside the user specifications are removed at 0916, or no data is removed otherwise. Next, the spike test lookup 0917 queries the user specifications as part of 0900. If the spike test is selected, data outside the user specifications are removed at 0918, or no data is removed otherwise. This completes the input data cleaning processor 0910.

Further referring to FIG. 10, the data fraction lookup 0920 queries the user specifications as part of 0900. If the remaining data fraction after the input data cleaning processor 0910 is outside the data fraction user specifications, user intervention is requested at 0930 and the method ends at 0940. If, however, the remaining data fraction is within the user specifications as part of 0900, the method continuous with the intermediary quantity calculation processor 0950.

Further referring to FIG. 10, in processor 0950 the streamline rotation lookup 0951 first queries the user specifications as part of 0900. If streamline rotation is selected, data are rotated at 0952 according to the user specifications, or no rotation is performed otherwise. Next, the regularization lookup 0953 queries the user specifications as part of 0900. If regularization is selected, data are regularized at 0954 according to the user specifications, or no regularization is performed otherwise. Next, the time synchronization lookup 0955 queries the user specifications as part of 0900. If time synchronization is selected, data are time-synchronized at 0956 according to the user specifications, or no time synchronization is performed otherwise. Next, the synthetic variables lookup 0957 queries the user specifications as part of 0900. If synthetic variables are selected, at 0958 the synthetic variables are computed, or no synthetic variables are computed otherwise. This completes processor 0950, and at 0960 the intermediary quantities are reported back to step 0421 in FIG. 4.

Figure 11:
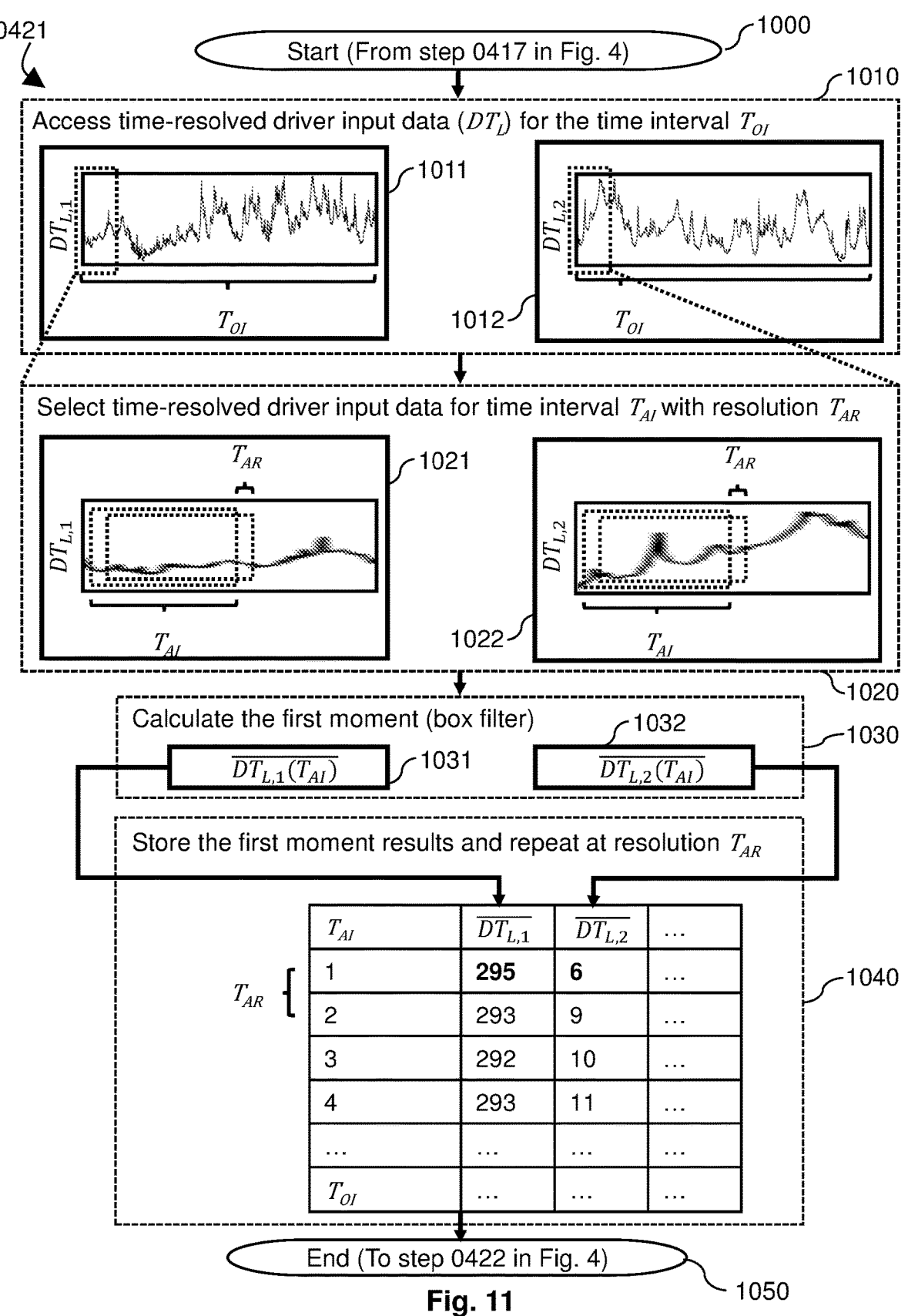
FIG. 11 details step 0421 (Calculate time-resolved drivers) in FIG. 4 and shows how a reference time representation can be generated by processing the time-resolved drivers in Lagrangian coordinate representation.

FIG. 11 illustrates how a reference time representation can be created and how the time-resolved drivers can be processed. The method shown in FIG. 11 applies to the items shown as steps 0417, 0421 and 0422 in FIG. 4. The method itself consists of four main processors, to access the time-resolved driver input data 1010, to select the time-resolved driver input data for a specified time interval 1020, to calculate the first moment 1030, and to store the first moment results 1040.

Further referring to FIG. 11, in processor 1010 the method commences with accessing the time-resolved driver input data ($DT_L$) for the entire time output interval $T_{OI}$, here exemplified for two time-resolved drivers $DT_{L,1}$ shown at 1011 and $DT_{L,2}$ shown at 1012, such as air temperature and humidity. Additional examples for time-resolved driver input data include but are not limited to solar radiation, and wind direction is prepared for later use in the align space representation processor 0430 in FIG. 4.

Further referring to FIG. 11, in processor 1020 the time align interval $T_{AI}$ is then selected from the time-resolved driver input data, and subsequently moves through the time output interval $T_{OI}$ with the time align resolution $T_{AR}$ as shown at 1021 and 1022.

Further referring to FIG. 11, in processor 1030 the first moment is then calculated for each time-resolved driver and time align interval $T_{AI}$, resembling a box filter and indicated with single overbars over the processed drivers $\overline{DT_{L,1}(T_{AI})}$ shown at 1031 and 1032.

Further referring to FIG. 11, in processor 1040 the first moment results are stored, and the method is repeated at time align resolution $T_{AR}$ over the time output interval $T_{OI}$. The above example illustrates the case for time-resolved driver input data that has a higher time resolution compared to the space and time aligned data table, hence using a box filter aggregation approach. Analogously, time interpolation approaches can be used if the time-resolved driver input data has a lower time resolution compared to the user-specified $T_{AR}$ from 0411 in FIG. 4 or default calculated $T_{AR}$ from 0412A in FIG. 4. Furthermore, the method is exemplified above for time-resolved driver input data that are collocated with the response input data. Analogously, if the driver input data is time-resolved and space-resolved such as frequently the case for outputs from mathematical process models, the above method applies to each time-resolved grid cell as shown at 1160A in FIG. 12.

Figure 12:
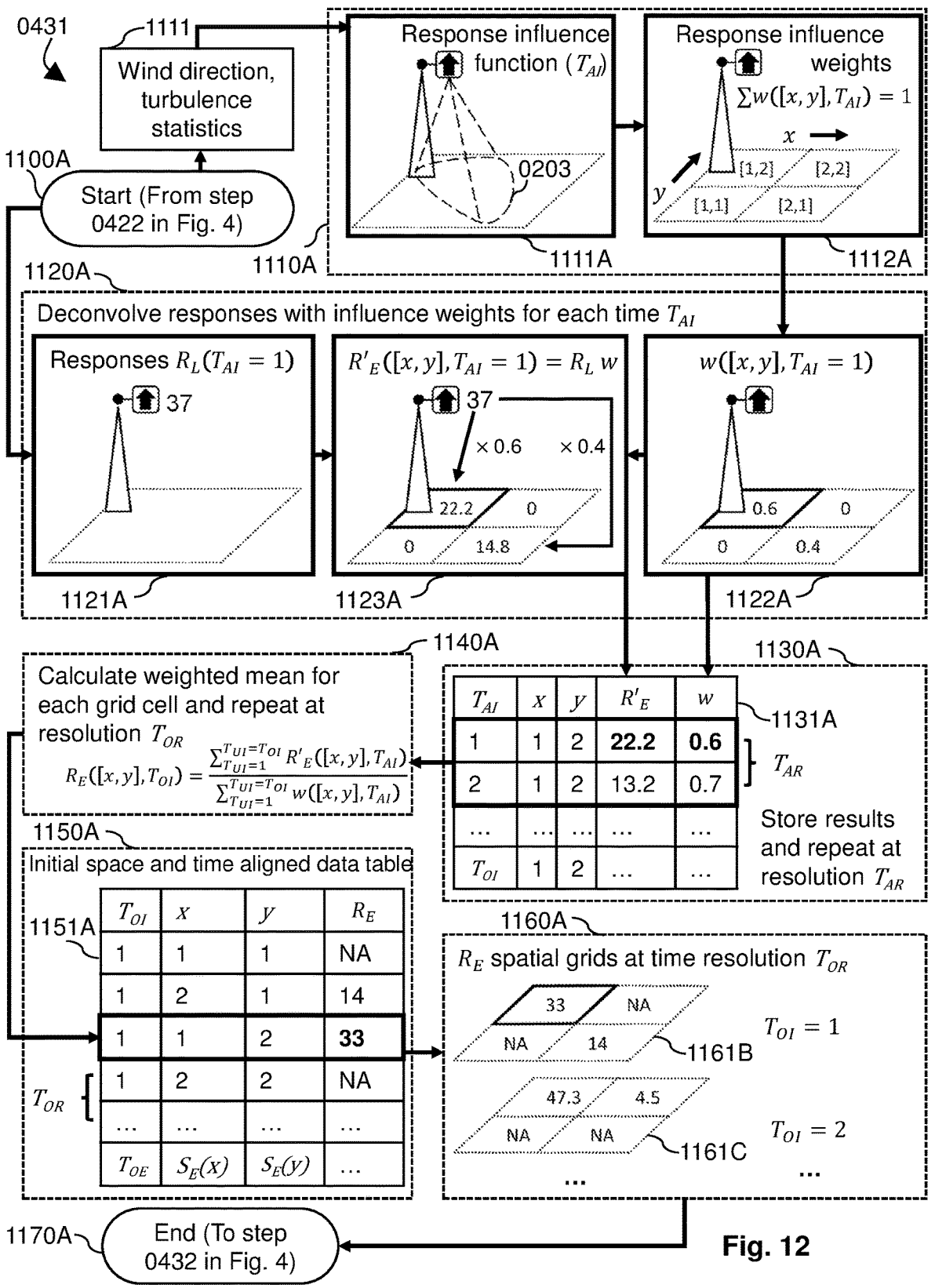
FIG. 12 details step 0431 (Deconvolve space-aggregated response to space and time aligned data table) in FIG. 4 and shows how an initial space and time aligned data table can be created by defining a reference Eulerian coordinate representation and georeferencing the responses.

FIG. 12 shows how an initial space and time aligned data table can be created by defining a reference Eulerian coordinate representation and georeferencing the responses. The method commences by receiving data from step 0422 in FIG. 4, as shown at step 1100A, and by receiving wind direction and turbulence statistics from step 0421 in FIG. 4, as shown at 1111.

Further referring to FIG. 12, in the next processor 1110A the method first derives the high-frequency continuous response influence function in Lagrangian coordinate representation at 1111A, which is then discretized at 1112A to high-frequency response surface influence weights in Eulerian coordinate representation at 1122A. Informing existing mathematical models (numerical, analytical or parameterization solution of the advection-diffusion equation) with the wind direction and turbulence statistics from step 1111 yields the continuous influence function 0203 for a given time align interval $T_{AI}$. In step 1112A the continuous influence function is then discretized to a gridded Eulerian surface with a space resolution as specified by the user in step 0411 in FIG. 4. For each Eulerian surface grid cell this yields the corresponding surface influence weight $w(x,y, T_{AI})$ of the responses 0110 in FIG. 1.

Further referring to FIG. 12, in the next processor 1120A the method accesses the high-frequency responses in Lagrangian coordinate representation from 0422 in FIG. 4, as shown at 1121A, and proceeds to deconvolve them with the high-frequency response influence weights in Eulerian coordinate representation at 1122A to high-frequency weighted responses in Eulerian coordinate representation at 1123A. the provided example details responses $R_L$ measured from only one single location. Analogously, the method can be applied to responses in the same or different units at a multitude of locations in three-dimensional space $R_L(x,y,z)$.

Further referring to FIG. 12, in the next processor 1130A the high-frequency response influence weights in Eulerian coordinate representation from 1122A and the high-frequency weighted responses in Eulerian coordinate representation from 1123A are stored in a high-frequency data table 1131A, which is repeated for each time align interval $T_{AI}$ at time align resolution $T_{AR}$ over the time output interval $T_{OI}$.

Further referring to FIG. 12, in the next processor 1140A the low-frequency unweighted responses in Eulerian coordinate representation are calculated for each grid cell, which is repeated for each time output interval $T_{OI}$ at time output resolution $T_{OR}$ over the time output extent $T_{OE}$.

Further referring to FIG. 12, in the next processor 1150A, the low-frequency unweighted responses in Eulerian coordinate representation from 1140A are stored in the initial low-frequency, space-time aligned data table 1151A, which is repeated for each time output interval $T_{OI}$ at time output resolution $T_{OR}$ over the time output extent $T_{OE}$, and across the space extent $S_E$.

Further referring to FIG. 12, in the next processor 1160A, the low-frequency unweighted responses in Eulerian coordinate representation from the initial low-frequency, space-time aligned data table 1151A can be presented as low-frequency unweighted response spatial grids in Eulerian coordinate representation for subsequent time output intervals $T_{OI}$, as shown at 1161B and 1161C.

Further referring to FIG. 12, the method completes with providing the initial low-frequency, space-time aligned data table 1151A and the low-frequency unweighted response grids 1160A to the next step in the process 0432 in FIG. 4, as shown at step 1170A.

FIG. 13 shows how the space-resolved drivers shown at 0121 in FIG. 1 and detailed in FIG. 3A and FIG. 3B can be joined into an intermediary space and time aligned data table in Eulerian coordinate representation. Examples for space-resolved driver input data include but are not limited to land surface temperature and soil moisture, albedo, vegetation indices, land cover and topography. The method commences by receiving data from step 0431 in FIG. 4, as shown at step 1100B, in particular the initial low-frequency, space-time aligned data table 1151A in FIG. 12 which contains the low-frequency unweighted responses in Eulerian coordinate representation, and the low-frequency unweighted response spatial grids 1161B and 1161C in FIG. 12.

Further referring to FIG. 13, in the next processor 1110B the method accesses a first space-resolved driver input data in Eulerian coordinate representation 1111B and a second space-resolved driver input data in Eulerian coordinate representation 1112B for an initial output interval ($T_{OI}=1$). The two space-resolved drivers are then joined to the initial low-frequency, space-time aligned data table 1151A in FIG. 12, which produces an intermediary, low-frequency, space-time aligned data table in Eulerian coordinate representation 1151B for an initial output interval ($T_{OI}=1$).

Further referring to FIG. 13, in the next processor 1110C the method accesses a first space-resolved driver input data in Eulerian coordinate representation 1111C and a second space-resolved driver input data in Eulerian coordinate representation 1112C for a subsequent output interval ($T_{OI}=2$). The two space-resolved drivers are then joined to the initial low-frequency, space-time aligned data table 1151B, which extends the intermediary, low-frequency, space-time aligned data table in Eulerian coordinate representation 1151C by the subsequent output interval ($T_{OI}=2$). This process is repeated at time output resolution $T_{OR}$ over the same time output extent $T_{OE}$, and across the same space extent $S_E$ as shown for the initial low-frequency, space-time aligned data table at 1151A in FIG. 12.

Further referring to FIG. 13, the above example illustrates the case of space-resolved driver input data that are static, i.e., not time-resolved. Analogously, if the driver input data is time-resolved and space-resolved such as frequently the case for satellite data and outputs from mathematical process models, the above method applies to each driver $DS_E(T_{IA})$, i.e., as a function of the time align interval $T_{AI}$. Also, the method is exemplified above for gridded space-resolved driver input data $DS_E$. Analogously, the continuous surface influence function can be combined directly with continuous space-resolved driver input data, such as vector images. The method completes with providing the intermediary low-frequency, space-time aligned data table 1151B to the next step in the process 0433 in FIG. 4, as shown at step 1130C.

FIG. 14 shows how the time-resolved drivers can be joined into a final space and time aligned data table in Eulerian coordinate representation through georeferencing. The method commences by receiving data from step 0423 in FIG. 4, as shown at step 1100D, specifically including the intermediary low-frequency, space-time aligned data table 1151C from FIG. 13. The method further receives wind direction and turbulence statistics from step 0421 in FIG. 4, as shown at 1111.

Further referring to FIG. 14, in the next processor 1110D the method first derives the high-frequency continuous driver influence function in Lagrangian coordinate representation at 1111D, which is then discretized at 1112D to high-frequency driver surface influence weights in Eulerian coordinate representation at 1122D.

Informing existing mathematical models (numerical, analytical or parameterization solution of the advection-diffusion equation) with the wind direction and turbulence statistics from step 1111 yields the continuous influence function 0309 for a given time align interval $T_{AI}$. In step 1112D the continuous influence function is then discretized to a gridded Eulerian surface with a space resolution as specified by the user in step 0411 in FIG. 4. For each Eulerian surface grid cell this yields the corresponding surface influence weight $q(X, y, T_{AI})$ of the time driver measurement values 0312C in FIGS. 3C and 0312D FIG. 3D.

Further referring to FIG. 14, in the next processor 1120D the method accesses the high-frequency drivers in Lagrangian coordinate representation from 0421 in FIG. 4, as shown at 1121D, and proceeds to deconvolve them with the high-frequency driver influence weights in Eulerian coordinate representation at 1122D to high-frequency weighted drivers in Eulerian coordinate representation at 1123D.

Further referring to FIG. 14, in the next processor 1130D the high-frequency driver influence weights in Eulerian coordinate representation from 1122D and the high-frequency weighted drivers in Eulerian coordinate representation from 1123D are stored in a high-frequency data table 1131D, which is repeated for each time align interval $T_{AI}$ at time align resolution $T_{AR}$ over the time output interval $T_{OI}$.

Further referring to FIG. 14, in the next processor 1140D the low-frequency unweighted drivers in Eulerian coordinate representation are calculated for each grid cell, which is repeated for each time output interval $T_{OI}$ at time output resolution $T_{OR}$ over the time output extent $T_{OE}$.

Further referring to FIG. 14, in the next processor 1150D, the low-frequency unweighted drivers in Eulerian coordinate representation from 1140D are joined in the intermediary low-frequency, space-time aligned data table 1151C from FIG. 13, to create the final, low-frequency, space-time aligned data table at 1151D. This is repeated for each time output interval $T_{OI}$ at time output resolution $T_{OR}$ over the time output extent $T_{OE}$, and across the space extent $S_E$. To summarize, the final space and time aligned data table 1151D can be created from:

(a) Low-frequency unweighted responses in Eulerian coordinate representation as shown at 1151A in FIG. 12 that originate from the environmental response input data 0110 in FIG. 1;

(b) First space-resolved driver input data in Eulerian coordinate representation, shown at 1111C in FIG. 13, that originate from an instrument for driver measurement on the satellite 0305A in FIGS. 3A and 0305B in FIG. 3B;

(c) Second space-resolved driver input data in Eulerian coordinate representation, shown at 1112C in FIG. 13, that come from an instrument for driver measurement on an aircraft 0302A in FIGS. 3A and 0302B in FIG. 3B;

(d) High-frequency continuous response influence function data in Lagrangian coordinate representation that has been discretized to high-frequency response surface influence weights in Eulerian coordinate representation, shown at 1122A in FIG. 12 and at 1122D in FIG. 14; and (e) Time-resolved low-frequency unweighted drivers in Eulerian coordinate representation, shown at 1151D, that originate from instruments for driver measurements on a tower, shown at 0308C in FIG. 3C and FIG. 3D.

Further referring to FIG. 14, the method completes with providing the final, low-frequency, space-time aligned data table 1151D to the next step in the process 0441 in FIG. 4, as shown at step 1160D.

FIG. 15 illustrates how the driver response relationship can be created in an Eulerian coordinate representation (i.e., after georeferencing all responses and drivers). The method shown in FIG. 15 applies to the item shown as step 0441 in FIG. 4 and consists of two main processors, to create the driver-response relationship model for the ceiling, 1210, as shown in 0632 in FIGS. 6 and 0730 in FIG. 7, and to create the driver-response relationship model for the volume 1220, as shown in 0632 in FIGS. 6 and 0720 in FIG. 7. In processor 1210 the method commences with the machine learning regression of responses at the ceiling $R_{E,c} \sim D_{E,c}$, yielding the driver-response relationship model at the ceiling $P_c(R_{E,c}, D_{E,c})$. In processor 1220 the method completes with the machine learning regression of responses within the volume $R_{E,v} \sim D_{E,v}$, yielding the driver-response relationship model within the volume $P_v(R_{E,v}, D_{E,v})$. The above example illustrates the case for creating driver-response relationship models to provide the two terms relevant for solving the reduced flux conservation equation 0632 in FIG. 6. Analogously, the method can be used to create different driver-response relationship models to solve different physical constraints.

FIG. 16 illustrates how the driver-response relationship models, here 1212 and 1222 in FIG. 15, are evaluated in conjunction with a physical constraint, such as the reduced flux conservation equation 0632 in FIG. 6. The method shown in FIG. 16 applies to the item shown as step 0442 in FIG. 4, and consists of three main processors, to evaluate the driver-response relationship model for the ceiling 1310 as shown in 0151 in FIG. 1, 0632 in FIGS. 6 and 0730 in FIG. 7, to evaluate the driver-response relationship model for the volume 1320 as shown in 0151 in FIG. 1, 0632 in FIGS. 6 and 0720 in FIG. 7, and to determine the flux from the floor 1330 as also shown at 1330 in FIG. 1 and FIG. 6, 0632 in FIG. 6 or 0710 in FIG. 7.

Further referring to FIG. 16, in processor 1310, the method commences with evaluating the driver-response relationship model for the ceiling $P_c(D_E, x, y, T_{OI})$ for all space-resolved and time-resolved drivers $D_E$ 1311. This yields the flux through the ceiling as shown in 0730 in FIG. 7, i.e., specifically the space-resolved and time-resolved responses 1312 in the Eulerian coordinate representation, and space resolution and time resolution of the drivers as shown in 0631 in FIG. 6.

Further referring to FIG. 16, in processor 1320, the method continuous with evaluating the driver-response relationship model for the volume $P_v(D_E,x,y,z, T_{OI})$ 1321 for all space-resolved and time-resolved drivers $D_E$. This yields the flux per vertical increment dz which is the volume accumulation as shown in 0720 in FIG. 7, i.e., specifically the space-resolved and time-resolved responses 1322 in Eulerian coordinate representation and in the space resolution and time resolution of the drivers as shown in 0631 in FIG. 6. Following the physical constraint 0632 in FIG. 6, subsequent vertical integration 1323 transforms the volume responses into the same coordinate representation, space resolution, time resolution and unit 1324 as the ceiling responses 1312.

Further referring to FIG. 16, completing the physical constraint 0632 in FIG. 6 by adding ceiling responses and volume responses yields the flux from the floor 1330, also shown in FIG. 1 and FIG. 6. This completes the method by which the two remaining differential equation terms in the physical constraint in 0632 in FIG. 6 become fully quantifiable, thus exemplifying how output data performance is improved through combining physical constraints and data science principles, as well as combining complementary information from space-resolved input data and time-resolved input data. The above example illustrates the case for creating driver-response relationship models to provide the two terms relevant for solving the reduced flux conservation equation 0632 in FIG. 6. Analogously, the method can be used to create different driver-response relationship models to solve different physical constraints.

Figure 17:
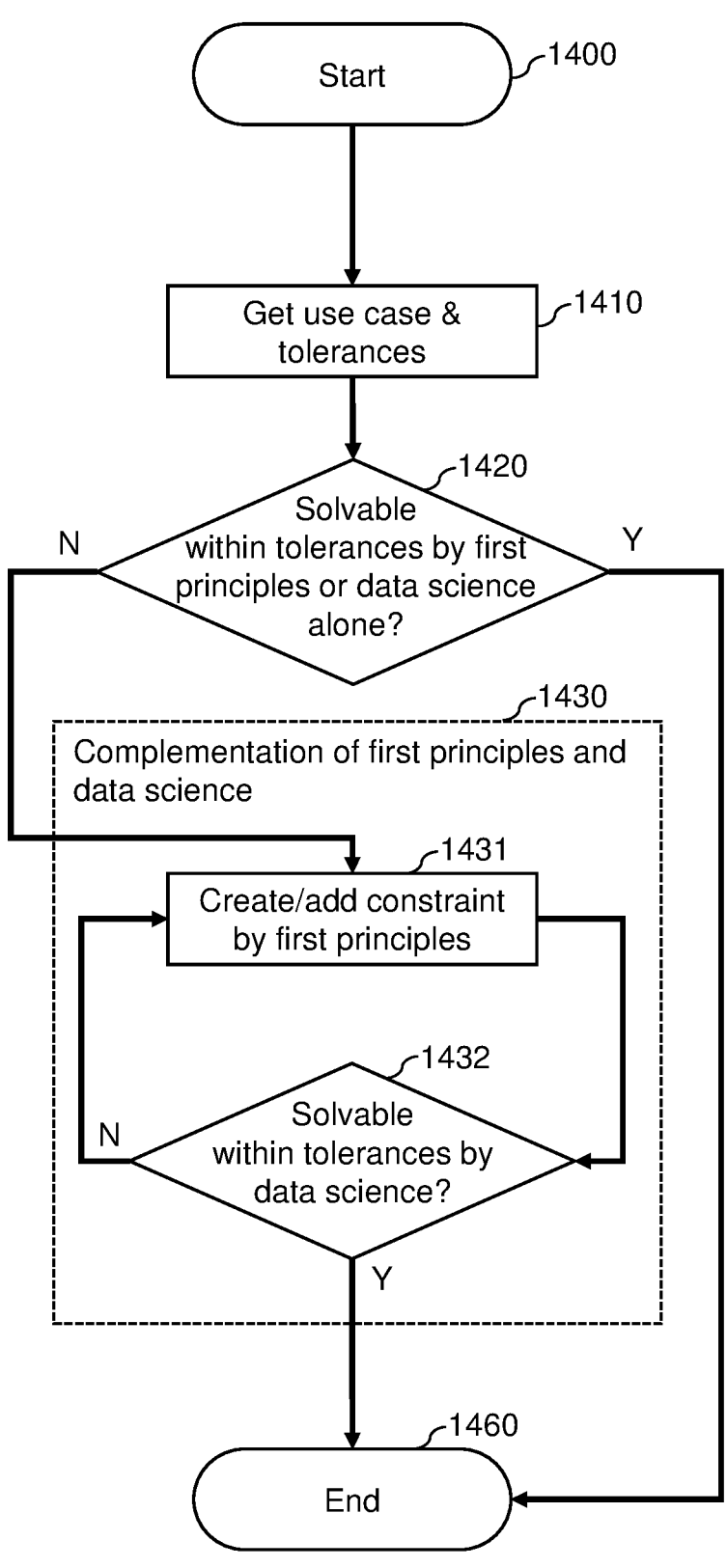
FIG. 17 shows how the physical constraints from the laws of science and data science principles can be used in conjunction with embodiments of the invention disclosed herein.

FIG. 17 illustrates how physical constraints from laws of science and data science principles complement each other in the systems and methods disclosed here, to systematically explore the natural and anthropogenic environment and generate new laws of science. The method described in FIG. 17 commences with obtaining a use case and corresponding tolerances on the solution 1410. It then inquires whether a use case is solvable within the provided tolerances either by physical constraints or data science principles alone 1420. If the use case is solvable within tolerances either by physical constraints or data science principles alone, the method ends here. Otherwise, the method continues with processor 1430, which complements the properties of physical constraints and data science in an iterative fashion. Specifically, initial physical constraints 1431 are created from first principles, such as 0632 in FIG. 6. Data science 1432 is then used to solve the unknown terms in the physical constraints 1431 through extracting reciprocal information such as through the method shown in FIG. 4 from data such as in 0110 in FIGS. 1 and 0120 in FIG. 1 or independent computer simulations, and if successful the method ends here 1460. If the use case is not solvable within tolerances in the first iteration, the method continues to iterate by adding further constraints through first principles 1431 and/or by providing additional data sources to the data science solver 1432. The method ends 1460 once the use case is solved within tolerances or another cutoff criterion is reached.

4. Processing Examples

The following is a processing example of element 0430 in FIG. 4, including some additional detail considerations. For example, for each flight leg one first calculates the time-aligned spatial grids of the response, and corresponding total footprint weights, standard error for each grid cell; the corollary for flux tower measurements could be a half-hourly time-aligned spatial grid of the response, consisting of 30×1-minute members:

Branch 1: simple/compact implementation, either space-resolved or time-resolved:

Pre-calculate a $T_{OR}$=30-minute time-aligned spatial grid of the response;

With EC raw data: from $T_{AR}$=1-min projections;

With EC 30-minute data: from variations of turbulence stats within SD;

If one is mostly after enhanced time-aligned spatial grids of the response 1160A, the sample size should be sufficient to increase the spatial coverage beyond the initial time-aligned spatial grids of the response 1160A separately for each flight leg (30-minute flux tower period); 30-minute example;

Spatial extent ~25× effective measurement height (cell size) for each 30 minutes;

Sample size (number of observations=number grid cells): $N_O$=25×25=625 for each 30 minutes;

This should necessitate only a small number of drivers e.g., EVI and LST (under the assumption of meteorological homogeneity and quasi-stationarity);

Response grid storage size estimate:

5500 columns×4500 rows=24750000 cells POLAR5 domain;

20 MB compress (GNU Zip), 120 MB ASCII grid;

24750000 cells/120 MB=206,250 cells per megabyte;

300×300=90,000 NEON tower domain;

90,000 cells/206250 cells per megabyte=0.4364 MB per RS ASCII grid;

3×0.4364 MB×48=~60 MB uncompressed (~10 MB compressed) for 3 flux response grids (H, LE, CO2) per processing day per site;

The benefit of this approach is that each flight leg/half hour tower flux map can be created separately with a minimum number of dependencies, and thus a very compact workflow.

Branch 2: full implementation, space-resolved and time-resolved;

Scale with time extent $T_{OE}$;

$T_{OE}$=48 $T_{OI}$=24 hours (default; also possible 30 minutes . . . -days . . . 365 days . . . );

$N_O$ (number of observations), $N_D$ (number of drivers);

$T_{OE}$: $T_{OR}$×~625 identifies $T_{OE}$ based on the expected/required $N_O$;

With default minimum $N_O$=500×$N_D$;

$T_{OE}$ as function of $T_{OR}$,$N_D$,$N_O$ required to achieve predefined tolerance TOL;

Modifiers to consider;

Factor for reduction in $N_O$ due to quality control;

Factor for self-correlation among $N_O$ as function of $T_{AR}$ and $T_{AI}$ (analogous to standard error degrees of freedom);

On the other hand, if one is after driver-response relationships in addition to enhanced time-aligned spatial grids of the response 1160A, then using multiple flight legs/half hour tower fluxes can help to obtain the necessary sample size to constrain a larger number of drivers for process insight and Earth System Model benchmarking;

Back-project changing meteo state variable drivers with a scalar footprint model, relative measurement height in the boundary layer;
With EC raw data: from one-minute projections;
With EC 30-minute data: from variations of turbulence stats within SD;
Allows to create driver maps for scale-equivalent generation of model inputs and evaluation of model outputs;
Daily example;
$N_O$=625 for each 30 minutes;
$N_O$=625×48=30,000 for each day;
Now perform the ERF machine learning:
Specific to a question, e.g., inventory validation by providing the inventory as a driver and using the resulting response functions to evaluate its fidelity;
In adherence to first principles, e.g., derive independent enhanced time-aligned spatial grids of the response without the inventory info, against which the inventory can then be evaluated in a subsequent, separate step.

5. Implementation Into an Emission Control System

Figure 18:
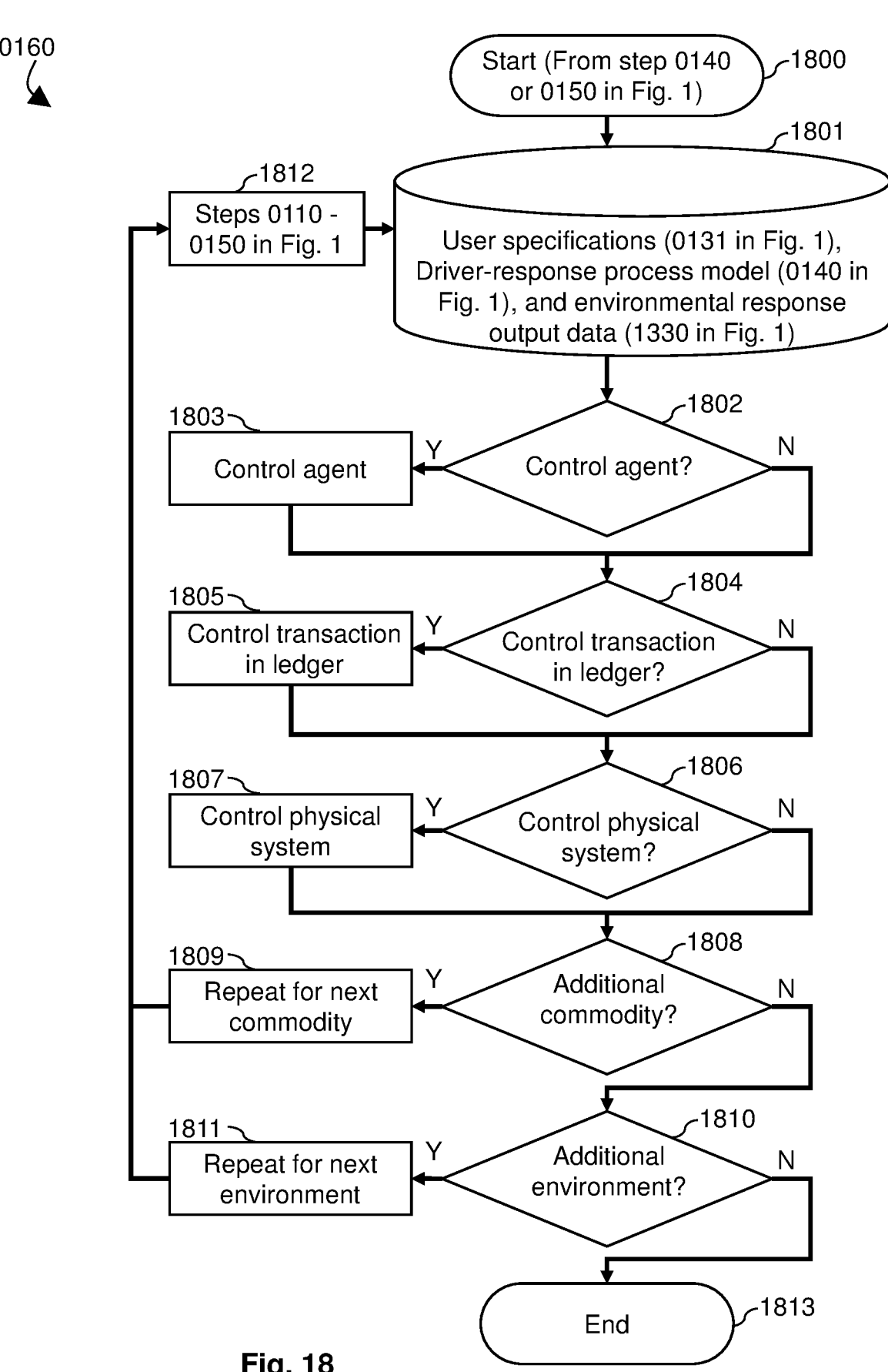
FIG. 18 details step 0160 (Control physical system) in FIG. 1 and provides an overview of the emission control method.

FIG. 18 shows the details of item 0160 of FIG. 1, and more specifically, FIG. 18 shows a system and method for using the driver-response process/relationship model (step 0140 in FIG. 1) or enhanced environmental response output information (step 1330 in FIG. 1) to control an agent (e.g., computer system), transactions in a ledger (e.g., database) or a physical system (e.g., energy production system). This method/system commences 1800 from step 0140 or 0150 in FIG. 1. The next step is to access user specifications (0131 in FIG. 1), the driver-response process model (0140 in FIG. 1), and the enhanced environmental response output data (1330 in FIG. 1) for a first commodity (e.g., $CO_2$) and a first environment (e.g., anthropogenic infrastructure), as shown at 1801. The user specifications (0131 in FIG. 1) are further detailed in 0411 in FIG. 4, and FIG. 5. Specifically, the user specifications (0131 in FIG. 1) include step 0541 in FIG. 5, which comprises a list of agents (e.g., a computer system) to control and attributes (e.g., space resolution), step 0542 in FIG. 5, which comprises a list of ledgers 5 list of ledgers (e.g., a database) to control and a list of transaction attributes (e.g., time resolution), step 0543 in FIG. 5, which comprises a list of physical systems (e.g., energy production system) to be controlled and attributes of these physical systems (e.g., maximum emission threshold), step 0544 in FIG. 5, which comprises a list of commodities (e.g., $CO_2$) to analyze and the related attributes of these commodities (e.g., reporting units), and step 0545 in FIG. 5, which comprises a list of environments (e.g., anthropogenic infrastructure) to be analyzed and the related attributes (e.g., spatial extent). The driver-response process model (0140 in FIG. 1) is further detailed in 0441 in FIG. 4, and FIG. 15. The enhanced environmental response output data (1330 in FIG. 1) is further detailed in 0442 in FIG. 4, and step 1330 in FIG. 16.

Referring to the next step in FIG. 18, the control agent lookup 1802 then queries the user specifications as part of 1801, specifically step 0541 in FIG. 5 (list of agents and attributes). If an agent is present in the user specifications as part of 1801 the method/system controls the agent 1803, or otherwise proceeds without controlling the agent. Next, the control transaction in ledger lookup 1804 queries the user specifications as part of 1801, specifically step 0542 in FIG. 5 (list of ledgers and transaction attributes). If a ledger is present in the user specifications as part of 1801 the method/ system controls the recording of the transaction in the ledger 1805, or otherwise, proceeds without controlling the recording of the transaction in the ledger. Next, the control physical system lookup 1806 queries the user specifications as part of 1801, specifically step 0543 in FIG. 5 (list of physical systems and attributes). If a physical system is present in the user specifications as part of 1801 the method/system controls the physical system 1807, or otherwise, proceeds without controlling the physical system. Next, the additional commodity lookup 1808 queries the user specifications as part of 1801, specifically step 0544 in FIG. 5 (list of commodities to analyze and attributes). If an additional commodity is present in the user specifications as part of 1801 the method/system then repeats steps 0110-0150 in FIG. 1 as shown at step 1812 before repeating steps 1801-1807 for the next commodity 1809, or otherwise, goes to step 1810, which queries the user specifications as part of 1801, specifically step 0545 in FIG. 5 (list of environments to analyze and associated attributes of these environments). If an additional environment is present in the user specifications as part of 1801 the method/system then repeats steps 0110-0150 in FIG. 1 as shown at step 1812 before repeating steps 1801-1809 for the next environment 1811, or otherwise, ends as shown at 1813.

Further referring to FIG. 18, in one embodiment the systems and methods that have been described can be used to control emissions between a physical system and a fluid directly. In this case, the control agent lookup 1802 is disabled, and control physical system lookup 1806 is enabled. Then the physical system is controlled directly in response to the environmental response output data or the driver-response process model 1801 exceeding a user specification as part of 1801 such as a maximum gradient. The method then controls the physical system 1807, so that the emissions between the physical system and a fluid return to within the user specification as part of 1801, subject to user concurrence. One application example for this embodiment is to control the valve in a pipeline 1807 if the driver-response process model 1801 exceeds the user specification as part of 1801, such as a maximum gradient. Another application example for this embodiment is to shade a body of water 1807 if the driver-response process model 1801 exceeds the user specification as part of 1801, such as a maximum gradient.

Further referring to FIG. 18, in another embodiment the systems and methods that have been described can be used to control emissions between a physical system and a fluid through an agent (e.g., computer system for visualization and forecasting). In this case, the control agent lookup 1802 is enabled, and control physical system lookup 1806 is enabled. Then, the method controls the agent 1803 which can combine the environmental response output data or the driver-response process model 1801 with additional data inputs. Then the physical system 1807 is controlled in response to the data outputs of the agent 1803 exceeding a user specification as part of 1801, such as an emission change-point. The method then controls the physical system 1807, so that the emissions between the physical system and a fluid return to within the user specification as part of 1801, subject to user concurrence. One application example for this embodiment is to close the valve in a pipeline 1807 if the data outputs of the agent 1803 exceed the user specification as part of 1801.

Further referring to FIG. 18, in another embodiment the systems and methods that have been described can be used to control the creation of a transaction in a ledger directly. In this case the control agent lookup 1802 is disabled, and the control transaction in ledger lookup 1804 is enabled. Then control actuation is performed directly in response to the environmental response output data or the driver-response process model 1801 exceeding a user specification as part of 1801, such as a time resolution. The method then controls creation of the transaction in a ledger 1805, so that the transaction can be exchanged as a commodity directly with other systems, or the transaction can be processed further into more sophisticated products, tools, services, and to control physical systems. One application example for this embodiment is to record environmental response output data 1801 methane emissions every half hour per user specifications as part of 1801 as transactions on an accounting balance sheet 1805 that summarizes the atmospheric methane balance for an oil and gas refinery over time. If both, the control transaction in ledger lookup 1804 is enabled and the control physical system lookup 1806 is enabled, then control actuation of 1807 control physical system can be performed in response to the transaction in a ledger 1805 exceeding a user specification as part of 1801 such as an emission change-point. The method then controls the physical system 1807, so that the emissions between the physical system and a fluid return to within the user specification as part of 1801, subject to user concurrence. One application example for this embodiment is to close the valve in a natural gas pipeline 1807 if the transaction in an accounting balance sheet 1805 exceeds the user specification as part of 1801.

Further referring to FIG. 18, in another embodiment the systems and methods that have been described can be used to control the creation of a transaction in a ledger through an agent. In this case the control agent lookup 1802 is enabled, and the control transaction in ledger lookup 1804 is enabled. Then the method calls the agent 1803 which combines the environmental response output data or the driver-response process model 1801 with additional data inputs. Control actuation is performed in response to the data outputs of the agent 1803 exceeding a user specification as part of 1801, such as time resolution. The method then creates the transaction in a ledger 1805, so that the transaction can be exchanged as a commodity directly with other systems, or the transaction can be processed further into more sophisticated products, tools, services, and to control other agents and physical systems. One application example for this embodiment is to record the data outputs of the agent 1803, forest $CO_2$ net-negative emission, every half hour per user specification as part of 1801 as transactions on an accounting balance sheet 1805 that summarizes the atmospheric $CO_2$ balance of forests across a jurisdiction overtime. Supply, demand and regulatory requirements can control the monetary value of these transactions, which can be traded as commodity certificates, for example as carbon credits. If both, the control transaction in ledger lookup 1804 is enabled and the control physical system lookup 1806 is enabled, then control actuation of 1807 control physical system can be performed in response to the transaction in a ledger 1805 exceeding a user specification as part of 1801 such as a maximum emission threshold. The method then controls the physical system 1807, so that the emissions between the physical system and a fluid return to within the user specification as part of 1801, subject to user concurrence. One application example for this embodiment is to stop deforestation 1807 if the transaction in an accounting balance sheet 1805 exceeds the user specification as part of 1801.

Further referring to FIG. 18, in another embodiment the systems and methods that have been described can be used to control the consistent creation of transactions for multiple commodities in a network of ledgers. In this case the additional commodity lookup 1808 is enabled and encompasses more than one commodity including but not limited to momentum flux, energy flux in particular of heat, mass flux in particular of $CH_4$, $CO_2$, $H_2O$, a nitrogen and oxygen compound (e.g., NO, $NO_2$, $NO_3$), $NH_4$, $H_2S$, VOC and $O_3$, particle flux, liquid fluid flux, and other types environmental responses. For the next commodity the method 1809 then repeats steps 1812-1807 per user specifications as part of 1801, and creates corresponding transactions in a network of ledgers 1805, so that transactions for multiple commodities are quantified by the same, consistent systems and methods that have been described. This can create a standard, e.g., across carbon, water, heat etc. commodity markets similar to the function of the US Dollar for stock, real-estate, currency etc. markets today. The transactions can be exchanged as commodities directly with other systems, or the transactions can be processed further into more sophisticated products, tools, services, and to control other agents and physical systems. One application example for this embodiment is to control a computer system for commodity visualization or forecasting with the heat, $CO_2$ and $H_2O$ transactions in the network of ledgers 1805. Another application example for this embodiment is to control the bioclimate for agricultural production with the heat and $H_2O$ transactions in the network of ledgers 1805, e.g., by opening and closing a valve in an irrigation system.

Further referring to FIG. 18, in another embodiment the systems and methods that have been described can be used to control the consistent creation of transactions for multiple environments in a single ledger or in a network of ledgers 1805. In this case the additional environment lookup 1810 is enabled and encompasses more than one environment. Examples of environments can include anthropogenic environments such as an urban region or an industrial area, and natural environments such as a forest, grassland and wetland. For the next environment the method 1811 then repeats steps 1812-1809 per user specifications as part of 1801, and creates corresponding transactions in a single ledger or in a network of ledgers 1805, so that transactions for multiple environments are quantified by the same, consistent systems and methods that have been described. This can create a standard, e.g., across engineered and nature-based climate interventions similar to the function of the US Dollar for stock, real-estate, currency etc. markets today. The transactions can be exchanged as commodities directly with other systems, or the transactions can be processed further into more sophisticated products, tools, services, and to control other agents and physical systems. One application example for this embodiment is to control an integrated system consisting of agriculture, biofuel production and carbon capture and storage with the $CO_2$ transactions in the network of ledgers 1805, e.g., by increasing carbon capture and storage during emission peaks.

In one embodiment the systems and methods that have been described can be used for mitigating emissions from industrial leaks, such as natural gas leaks occurring during oil and gas extraction and delivery, power generation and general production. In this case the environmental response input data could be methane emissions, which is a type of mass flux. The first environmental driver input data could be information on production buildings and transportation networks, which is a type of anthropogenic infrastructure, as well as being a type of land use data. The second environmental driver input data could be information on the occurrence of methane in the natural environment, which is a type of geologic data.

In another embodiment the systems and methods that have been described can be used for characterizing and monitoring emissions, and validating emission inventories for agriculture, livestock, vehicular transportation, domestic heating and other sectors of anthropogenic activity. In this case the environmental response input data could be volatile organic compound emissions, which is a type of mass flux. The first environmental driver input data could be information on anthropogenic infrastructure. The second environmental driver input data could be information on volatile organic compound concentration, which is a type of scalar concentration data.

In another embodiment the systems and methods that have been described can be used for air quality control. In this case the environmental response input data could be particle flux data. The first environmental driver input data could be information on anthropogenic infrastructure. The second environmental driver input data could be particle count data.

In another embodiment the systems and methods that have been described can be used for urban heat control. In this case the environmental response input data could be energy flux data. The first environmental driver input data could be information on temperature. The second environmental driver input data could be information on radiation.

In another embodiment the systems and methods that have been described can be used for precision agriculture and farming including to control crop and/or cattle intensity, irrigation, fertilization and feeding. In this case the environmental response input data could be $CO_2$ (carbon dioxide), $CH_4$ (methane) and/or $N_2O$ (nitrous oxide) exchange, which is a type of mass flux. The first environmental driver input data could be information on land use. The second environmental driver input data could be information on scalar concentration.

In another embodiment the systems and methods that have been described can be used for quantifying natural emissions and water management, such as atmospheric water loss from inland waters incl. lakes and reservoirs or net ecosystem exchange of coastal marshes. In this case the environmental response input data could be $H_2O$ (water vapor) or CO2 (carbon dioxide) emissions, which is a type of mass flux. The first environmental driver input data could be information on land use. The second environmental driver input data could be information on humidity.

In another embodiment the systems and methods that have been described can be used for quantifying natural climate solutions, such as carbon monitoring and carbon trading for natural and anthropogenic environments. In this case the environmental response input data could be $CO_2$ (carbon dioxide), $CH_4$ (methane) and/or $N_2O$ (nitrous oxide) exchange, which is a type of mass flux. The first environmental driver input data could be information on land use. The second environmental driver input data could be information on scalar concentration.

In another embodiment the systems and methods that have been described can be used for controlling renewable energy production, such as for solar parks and wind farms. In this case the environmental response input data could be momentum flux data. The first environmental driver input data could be information on land use. The second environmental driver input data could be information on wind data.

It can be understood that embodiments of the inventions can comprise any combination of any of the preceding examples, or any other similar implementation capable of being understood by anyone skilled in the art.

6. Additional Embodiments and Variations

Example variations of processor 0420 Align time representation (a) Time align and/or time output resolution, interval, and/or extent parameters can be adjusted to accommodate the properties of the input data, and/or to realize an embodiment most efficiently and effectively within specified tolerances.

(b) Different signal processing techniques can be used to align the time representation, including but not limited to box filter, discrete Wavelets, continuous Wavelets, Empirical Mode Decomposition, and/or Hilbert-Huang Transform.

(c) If the signal processing separates time from frequency and/or space from wavelength, the downstream processors 0430 Align space representation and 0440 Produce outputs can be evaluated individually for each frequency and/or wavelength.

Example variations of processor 0430 Align space representation (a) Space align and/or space output resolution, interval, and/or extent parameters can be adjusted to accommodate the properties of the input data, and/or to realize an embodiment most efficiently and effectively within specified tolerances.

(b) The response influence function (0203) and/or the driver influence function (0309) can be generated from existing mathematical models. One exemplary type of such mathematical models explicitly considers the 2-dimensional and/or 3-dimensional wind field such as Computational Fluid Dynamics and/or numerical modeling of particle dispersion. Another exemplary type of such mathematical models only considers the measured wind statistics such as analytical solutions and/or parameterizations of the advection-diffusion equation.

(c) The calculation of low-frequency unweighted responses and/or of time-resolved drivers in Eulerian coordinate representation (1140A, 1140D), and the generation of the low-frequency, space-time aligned data table (1151A, 1151B, 1151C, 1151D) can be replaced by embedding the Lagrangian-to-Eulerian deconvolution into the generation of the driver-response process model (0441). In this case all responses in Lagrangian coordinate representation $R_L$ and their accompanying influence weights $w_{BL}$, all time-resolved drivers in Lagrangian coordinate representation $D_{TL}$ and their accompanying influence weights $w_{DTL}$, as well as all space-resolved drivers in Eulerian coordinate representation $DS_E$ are combined into a single high-frequency data table (1130B, 1130D). The Lagrangian-to-Eulerian deconvolution embedded in the generation of the driver-response process model (0441) then utilizes this high-frequency data table to find the responses in Eulerian coordinates $R_E$ as solution to a convolution equation of a general form such as $R_E * w(w_{RL}, D_{TL}, w_{DTL}, DS_E, \ldots) = RL$, e.g. through statistical inversion or machine learning.

Example variations of processor 0440 Produce outputs:

(a) Different solver algorithms can be used to produce outputs, including but not limited to statistical inversion such as Bayesian inversion, Boosted Regression Trees, Gaussian Processes, Deep Neural Networks, Foundation Models, Transformers and/or knowledgeguided, explainable artificial intelligence with consideration of process lags and causation.

(b) Influence weights and/or performance metrics specific to each entry can be stored in the space and time aligned data table (1151D) and can be used for weighting each entry and/or for filtering reliable entries.

(c) The outputs can be accompanied by detailed performance metrics. For example, the values of the environmental driver input data and environmental response input data can be varied within the range of their accompanying systematic and random errors specific to each entry in the space and time aligned data table (1151D). These are then propagated by generating an ensemble of process models (0441) and enhanced responses (0442), which in turn are summarized in performance metrics such as median, median absolute deviation, and/or interquartile range for each combination of times (T) and locations (x, y), and/or in aggregate.

(d) The process model (0441) can be generated and the enhanced responses (0442) can be produced jointly for all available combinations of times (T) and locations (x, y) in the space and time aligned data table (1151D), or individually for any subset of time(s) and location (s). One example is the realization of an individual location for a sufficient number of times (~1,000 . . . 10,000 per driver).

(e) The enhanced responses (0442) can be produced jointly from all available drivers in the space and time aligned data table (1151D), or individually for any subset of driver(s). One example application for subsetting drivers is to partition constituent processes and corresponding terms of the response, such as separating $CO_2$ net ecosystem exchange into respiration and photosynthesis. The enhanced response such as $CO_2$ net ecosystem exchange can be determined from all available drivers. Individual constituent term(s) such as respiration can be determined by inhibiting key driver (s) such as solar radiation. Residual term(s) such as photosynthesis can be determined from additionality of net ecosystem exchange and respiration.

(f) Enhanced responses can be produced for the exact combinations of driver-response value pairs, for interpolations between the exact combinations of driver-response value pairs, and for extrapolations beyond the range of the exact combinations of driver-response value pairs. For example, when producing the enhanced responses (0442) extrapolation can improve spatial coverage in locations where the value of a space driver exceeds its range of values in the space and time aligned data table (1151D), subject to increased, quantified errors of the enhanced response for that location.

(g) The process model (0441) can be used to transfer information from one dataset to another dataset. In this case the environmental response input data and the environmental driver input data to generate the space and time aligned data table (1151D) and the process model (0441) can be measurements. And the environmental response input data to produce the enhanced responses (0442) can be outputs of mathematical process models and/or re-analyses of data that was collected in other ways.

(h) The process model (0441) can be stored directly and/or be parameterized. For example, the stored process model and/or its parameterization can then be used to benchmark existing mathematical process models and/or to create new knowledge/process insight. The stored process model and/or its parameterization can also be executed as a standalone process model and/or as a real-time extension processor of existing mathematical process models.

Example variations of measurements and data types:

(a) It is possible to combine response data from measurements on multiple platforms of the same and/or different type, and/or to combine driver data from measurements on multiple platforms of the same and/or different type. For example, $CO_2$ net ecosystem exchange responses can be combined among measurements from a multitude of dedicated, cell, radio and/or television towers, as well as with measurements from manned and/or unmanned aircraft, vessels and/or buoys etc.

(b) The systems and methods that have been described can ingest responses and drivers and/or produce enhanced responses in rasterized and/or vectorized data formats. For example, a space driver could be provided as a rasterized ASCII Grid and/or as a vectorized Shape file, with vectorized data formats reducing computational expense and providing improved distinction between features of the enhanced responses.

Example variations to construct a decision tree framework:

(a) It is possible to enhance the systems and methods described in this document in ways to create a decision tree framework.

(b) The objective of such decision tree framework is to minimize the requirements on input data and computational resources for achieving results at a defined level of performance, and thus to maximize cost-efficiency.

(c) For example, an additional lookup can be added after the align time representation processor 0420 in FIG. 4. This lookup then directs to individual steps in the align space representation processor 0430 and subsequent steps in FIG. 4. The framework makes the decision as a function of user specifications and internally computed metrics including but not limited to output data performance, space output extent and resolution, time output extent and resolution, number of drivers, resulting sample size to generate driver-response process model etc.

In another embodiment the systems and methods that have been described can be used for filling response measurement space and/or time gaps. In this case the environmental response input data could be incomplete in space and/or time. The first environmental driver input data and the second environmental driver input data could be more complete in space and/or time compared to the environmental response input data. The enhanced responses will then converge towards the joint completeness of the first and second environmental driver input data.

In another embodiment the systems and methods that have been described can be used for Observing System Simulation Experiments to test different designs and the optimize performance of instruments and/or integrated observing systems before their instruments are actually built or deployed. In this case the environmental response input data and the environmental driver input data can be outputs of mathematical process models, e.g. Computational Fluid Dynamics and/or the re-analysis of data that was collected in other ways.

In another embodiment the systems and methods that have been described can be used to transfer information from the time and/or space scale of the response measurement to the time and/or space scale of the target application, such as scale-equivalent data-science. In this case the align time and/or space resolution, interval, and/or extent can correspond to the time and/or space scale of the response measurements, and the output time and/or space resolution, interval, and/or extent can correspond to the time and/or space scale of the target application.

In another embodiment the systems and methods that have been described can be used to correlate, validate, calibrate and/or interpret data that was collected in other ways. In this case the environmental response input data could be $CO_2$ (carbon dioxide), $CH_4$ (methane) and/or $NO_2$ (nitrous oxide) exchange, which is a type of mass flux. The first environmental driver input data could be the hyperspectral signatures of the land cover, thus allowing to determine the environmental processes corresponding to individual spectral bands and/or subsets of spectral bands. The second environmental driver input data could be information on scalar concentration.

The alternative features and configurations described in this document can be combined in any way capable of being understood by anyone skilled in the art. A number of variations and modifications of the disclosed embodiments can also be used. While the principles of the disclosure have been described above in connection with specific apparatuses and methods, it is to be clearly understood that this description is made only by way of example and not as limitation on the scope of the disclosure.

What is claimed is:

1. A control method, wherein:
the method comprises the steps of:
    receiving, from a first measurement instrument, environmental response input information from at least a first time and from at least a first location;
    receiving, from a second measurement instrument, environmental driver input information wherein the environmental driver input information comprises at least one of:
        space-varying environmental driver input information from at least the first time and from a plurality of locations wherein the plurality of locations comprises at least the first location; or
        time-varying environmental driver input information from at least the first location and from a plurality of times wherein the plurality of times comprises at least the first time;
    combining the environmental response input information and the environmental driver input information into a space and time aligned data set that relates time information, location information, the environmental response input information, and the environmental driver input information;
    using the space and time aligned data set to generate a driver-response relationship model, wherein:
        the driver-response relationship model comprises driver-response information in a Eulerian coordinate representation; and
        generating the driver-response relationship model via a Lagrangian-to-Eulerian deconvolution, wherein said Lagrangian-to-Eulerian deconvolution is responsive to time information, location information, the environmental response input information from the first measurement instrument, and the environmental driver input information from the second measurement instrument; and applying the driver-response relationship model to the environmental driver input information to produce enhanced environmental response output information wherein:
the enhanced environmental response output information is responsive to the driver-response relationship model;
the enhanced environmental response output information has been improved from the environmental response input information in at least one of the following ways:
    the enhanced environmental response output information has improved accuracy;
    the enhanced environmental response output information has improved precision;
    the enhanced environmental response output information comprises a greater time resolution, time extent, or time coverage; or
    the enhanced environmental response output information comprises a greater space resolution, space extent, or space coverage in one-dimensional, two-dimensional, or three-dimensional space; and
the control method controls:
    an industrial leak;
    a valve in a pipeline;
    a water valve in an irrigation system; or
    a recording of a value in a ledger,
by using the enhanced environmental response output information.

2. The control method of claim 1 wherein:
the method further comprises a step of looking up an external agent in a list; and
the method is configured to control the recording of the value in the ledger through the external agent.

3. The control method of claim 1 wherein:
the method is configured to control the valve in the pipeline.

4. The control method of claim 1 wherein:
the method further comprises a step of looking up an external agent in a list; and
the method is configured to control the water valve in the irrigation system through the external agent.

5. The control method of claim 1 wherein:
the method is configured to control the recording of the value in the ledger.

6. The control method of claim 1, wherein:
the method is further configured to control the industrial leak in response to an external agent; and
the external agent is responsive to the enhanced environmental response output information to control the industrial leak.

7. The control method of claim 1, wherein:
the method is configured to control the recording of the value in the ledger in response to the enhanced environmental response output information;
the ledger comprises an individual list of transactions for accounting purposes;
the value in the ledger comprises a quantity of a greenhouse gas emission selected from the group of:
    carbon dioxide;
    methane; and
    nitrous oxide; and
the method is further configured to control the emission quantity of a tradeable certificate in response to the value in the ledger.

8. The control method of claim 1 wherein:
the first measurement instrument comprises an anemometer; and the second measurement instrument comprises a gas analyzer.

9. A method for controlling a system, wherein:

the method controls:

an industrial leak;

a valve in a pipeline;

a water valve in an irrigation system; or a ledger;

the method comprises the steps of:

receiving, in a first step, environmental response input information from at least a first time and from at least a first location, wherein the environmental response information is received from a first measurement instrument;

receiving, in a second step and from a second measurement instrument, environmental driver input information wherein the environmental driver input information comprises at least one of:

space-varying environmental driver input information from at least the first time and from a plurality of locations wherein the plurality of locations comprises at least the first location; or time-varying environmental driver input information from at least the first location and from a plurality of times wherein the plurality of times comprises at least the first time;

combining, in a third step, the environmental response input information and the environmental driver input information into a space and time aligned data set that relates time information, location information, the environmental response input information, and the environmental driver input information;

generating, in a fourth step, a driver-response relationship model in response to the space and time aligned data set; and using a Lagrangian-to-Eulerian deconvolution in the third step or the fourth step to generate the driver-response relationship model; and controlling the industrial leak;

the valve in the pipeline;

the water valve in the irrigation system; or the ledger, by applying the driver-response relationship model.

10. The method of claim 9 wherein:

the environmental driver information comprises methane concentration;

the method controls the valve in the pipeline.

11. The method of claim 9 wherein:

the method controls a value of a tradeable certificate in the ledger.

12. The method of claim 9, wherein:

the method further comprises the steps of:

generating environmental response influence weights in response to the environmental response input information, wherein the environmental response influence weights comprise a relative contribution of a plurality of locations on a Eulerian surface;

generating environmental driver influence weights in response to the environmental driver input information, wherein the environmental driver influence weights comprise the relative contribution of the plurality of locations on the Eulerian surface; and generating the driver-response relationship model is responsive to the environmental response influence weights and the environmental driver influence weights.

13. The method of claim 9, wherein:

the space and time aligned data set comprises data in a Eulerian coordinate representation; and the space and time aligned data set comprises:

time information;

a minimum of two spatial coordinate fields, wherein the spatial coordinate fields comprise information expressed in orthogonal cartesian coordinates;

environmental responses in a Eulerian coordinate representation; and environmental drivers in a Eulerian coordinate representation.

14. The method of claim 9, wherein:

the space and time aligned data set comprises data in a Lagrangian coordinate representation;

the method further comprises using the Lagrangian-to-Eulerian deconvolution in the fourth step to generate the driver-response relationship model; and the driver-response relationship model comprises driver-response information in a Eulerian coordinate representation.

15. The method of claim 9, wherein:

the method further comprises a step of looking up an external agent in a list;

the method is configured to control a recording in the ledger through the external agent;

the ledger comprises an individual list of transactions for accounting purposes; and the recording in the ledger comprises a quantity of a greenhouse gas emission selected from the group of:

carbon dioxide;

methane; and nitrous oxide.

16. The method of claim 9, wherein:

the method is configured to control a recording in the ledger in response to the driver response relationship model; and the method is configured to control the emission quantity of a tradable carbon credit certificate in response to the recording in the ledger.

17. A control system, comprising:

a first measurement instrument configured for receiving environmental response input information at a first time and from a first location;

a second measurement instrument configured for receiving environmental driver input information, wherein the environmental driver input information comprises at least one of:

space-varying environmental driver input information from at least the first time and from a plurality of locations wherein the plurality of locations comprises at least the first location; or time-varying environmental driver input information from at least the first location and from a plurality of times wherein the plurality of times comprises at least the first time; wherein the control system combines the environmental response input information and the environmental driver input information to produce a space and time aligned data set that relates time information, location information, the environmental response input information, and the environmental driver input information; and generates a driver-response relationship model in response to the space and time aligned data set;

the driver-response relationship model comprises driver-response information in a Eulerian coordinate representation that has been deconvolved from a Lagrangian coordinate representation; and the control system controls:

an industrial leak;

a valve in a pipeline;

a water valve in an irrigation system; or a transaction in a ledger, by using the driver-response relationship model.

18. The control system of claim 17 wherein:

the driver-response relationship model is generated in response to environmental response influence weights;

the environmental response influence weights are responsive to the environmental response input information;

the environmental response influence weights comprise a relative contribution of a plurality of locations on a Eulerian surface.

19. The control system of claim 17 wherein:

the control system is configured for controlling the transaction in the ledger in response to the driver-response relationship model;

the ledger comprises an individual list of transactions for accounting purposes;

the transaction in the ledger comprises a quantity of a greenhouse gas emission selected from the group of:

carbon dioxide;

methane; and nitrous oxide; and the control system is further configured to control the emission quantity of a tradeable certificate in response to the transaction in the ledger.

20. The control system of claim 17 wherein:

the space and time aligned data set comprises data in a Lagrangian coordinate representation;

the driver-response relationship model has been deconvolved from the space and time aligned data set that is in said Lagrangian coordinate representation.

* * * * *